US012526835B2

(12) United States Patent
Su et al.

(10) Patent No.: US 12,526,835 B2
(45) Date of Patent: Jan. 13, 2026

(54) DATA TRANSMISSION METHOD AND APPARATUS, AND SYSTEM

(71) Applicant: HUAWEI TECHNOLOGIES CO., LTD., Shenzhen (CN)

(72) Inventors: Hongjia Su, Shanghai (CN); Lei Dong, Shanghai (CN); Wenting Guo, Shenzhen (CN); Xiang Mi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 542 days.

(21) Appl. No.: 18/164,814

(22) Filed: Feb. 6, 2023

(65) Prior Publication Data
US 2023/0189325 A1 Jun. 15, 2023

Related U.S. Application Data

(63) Continuation of application No. PCT/CN2020/107854, filed on Aug. 7, 2020.

(51) Int. Cl.
*H04W 72/563* (2023.01)
*H04W 72/25* (2023.01)
*H04W 72/543* (2023.01)

(52) U.S. Cl.
CPC ......... *H04W 72/563* (2023.01); *H04W 72/25* (2023.01); *H04W 72/543* (2023.01)

(58) Field of Classification Search
CPC . H04W 72/563; H04W 72/25; H04W 72/543; H04W 72/02; H04W 72/40; H04W 74/0808
See application file for complete search history.

(56) References Cited

U.S. PATENT DOCUMENTS

2018/0206260 A1* 7/2018 Khoryaev ............ H04W 72/56
2019/0075548 A1 3/2019 Lee et al.
(Continued)

FOREIGN PATENT DOCUMENTS

CN 110234139 A 9/2019
CN 111464952 A 7/2020
(Continued)

OTHER PUBLICATIONS

NTT Docomo, Inc., "Discussion on details of pedestrian UE partial sensing", R1-1610035, 3GPP TSG RAN WG1 Meeting #86bis, Lisbon, Portugal, Oct. 10-14, 2016, 3 pages.
(Continued)

*Primary Examiner* — Tejis Daya
(74) *Attorney, Agent, or Firm* — Maier & Maier, PLLC

(57) ABSTRACT

A data transmission method and apparatus are applicable to fields such as V2X, intelligent driving, and connected vehicles. A probability of a collision between a high-priority PSSCH and a low-priority PSSCH is reduced, thereby improving QoS of the high-priority PSSCH. The method includes: obtaining resource pool configuration information including first resource pool information and second resource pool information, where the first resource pool information indicates a first resource pool, and the second resource pool information indicates a second resource pool; obtaining a first priority value corresponding to a physical sidelink shared channel PSSCH; when the first priority value is less than a first priority threshold, determining, in a partial-sensing-selection-based resource determination mechanism and/or a random-selection-based resource determination mechanism in the first resource pool, a resource for sending the PSSCH.

16 Claims, 6 Drawing Sheets

(56) References Cited

U.S. PATENT DOCUMENTS

| | | | |
|---|---|---|---|
| 2019/0349952 A1* | 11/2019 | Uchiyama | G08G 1/0965 |
| 2020/0221423 A1* | 7/2020 | Wang | H04W 72/02 |
| 2023/0084593 A1* | 3/2023 | Hoang | H04W 52/0225 |
| | | | 370/311 |

FOREIGN PATENT DOCUMENTS

| | | |
|---|---|---|
| EP | 3672338 A1 | 6/2020 |
| WO | 2018084575 A1 | 5/2018 |

OTHER PUBLICATIONS

3GPP TS 38.214 V16.2.0, "3rd Generation Partnership Project; Technical Specification Group Radio Access Network; NR; Physical layer procedures for data (Release 16)", Jun. 2020, 163 pages.

* cited by examiner

DATA TRANSMISSION METHOD AND APPARATUS, AND SYSTEM

CROSS-REFERENCE TO RELATED APPLICATIONS

This application is a continuation of International Application No. PCT/CN2020/107854, filed on Aug. 7, 2020, the disclosure of which is hereby incorporated by reference in its entirety.

TECHNICAL FIELD

The embodiments relate to the field of communication, a data transmission method and apparatus, and a system.

BACKGROUND

With the development of wireless communication technologies, people's requirements for a high data rate and user experience are increasing. Therefore, people's requirements for proximity services that understand surrounding people or things and communicate with the surrounding people or things gradually increase. Therefore, a device-to-device (D2D) technology emerges. The D2D technology allows a plurality of user equipment (UE) to support a D2D function to perform direct discovery and direct communication when a network infrastructure is available or unavailable. In a network of a long term evolution (LTE) technology proposed by the 3$^{rd}$ Generation Partnership Project (3GPP), an Internet of Vehicles technology of vehicle-to-everything (V2X) is further proposed. In a user resource self-selection mode in a V2X scenario, resource pool configuration information includes at least two types of resource pools. One type is a resource pool from which a UE selects, based on sensing, a resource used for data transmission. The other type is a resource pool from which the UE selects, based on partial-sensing selection, a resource used for data transmission, or a resource pool from which the UE randomly selects a resource used for data transmission. The UE performing random selection excludes a resource based on a sensing result, so that a probability that the randomly selected resource collides with a resource selected by another user is increased.

Currently, to reduce a resource collision probability, different types of resource pools in which resource selection is performed based on sensing and resource selection is performed based on partial-sensing selection may be separately configured, and time-frequency resources in the resource pools do not completely overlap. Therefore, interference between UEs that perform different resource selection can be reduced, that is, a UE that selects a resource based on sensing and a UE that randomly selects a resource perform resource selection in different resource pools.

However, because quality of service (QoS) of each piece of data is different, a priority of a physical sidelink shared channel (PSSCH) in each transmission is also different, and resource selection is performed in different resource pools. In a transmission manner of randomly selecting a resource, a probability that a high-priority PSSCH encounters a collision is similar to a probability that a low-priority PSSCH encounters a collision. Therefore, when resource selection is performed at the same time, a high-priority PSSCH may collide with a low-priority PSSCH. Therefore, a QoS requirement of the high-priority PSSCH cannot be ensured, and in this way, QoS of the high-priority PSSCH is reduced.

SUMMARY

The embodiments may provide a data transmission method and apparatus, and a device, to reduce a probability of a collision between a high-priority PSSCH and a low-priority PSSCH. In this way, QoS of the high-priority PSSCH can be ensured and the QoS of the high-priority PSSCH can be improved.

According to a first aspect, the embodiments may provide a data transmission method. The method includes: First, resource pool configuration information including first resource pool information and second resource pool information is obtained, where the resource pool configuration information may be obtained based on configuration of a sidelink bandwidth part (SL-BWP), the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes at least one of a partial-sensing-selection-based resource determination mechanism and a random-selection-based resource determination mechanism. It should be understood that, in actual application, the resource determination mechanism of the first resource pool may further include partial-sensing selection and/or random selection, and the second resource pool can be used only for partial-sensing selection and/or random selection. This is not limited herein. Then, a first priority value corresponding to a physical sidelink shared channel (PSSCH) is obtained. The first priority value is a priority corresponding to the PSSCH, and the first priority may be indicated in corresponding SCI. It should be understood that the first priority value may be a priority corresponding to data carried on the PSSCH, or the first priority value may be a priority corresponding to a data service carried on the PSSCH. When the first priority value is less than a first priority threshold, it is determined to determine, in the partial-sensing-selection-based resource determination mechanism and/or the random-selection-based resource determination mechanism in the first resource pool, a resource for sending the PSSCH; and when the first priority value is greater than or equal to the first priority threshold, it is determined to determine, in the partial-sensing-selection-based resource determination mechanism and/or the random-selection-based resource determination mechanism in the second resource pool, a resource for sending the PSSCH.

In this implementation, because a smaller priority value indicates a higher priority, when the first priority value is less than the first priority threshold, for a high-priority PSSCH, it may be determined to determine, in the partial-sensing-selection-based resource determination mechanism and/or the random-selection-based resource determination mechanism in the first resource pool, a resource for sending the PSSCH. A probability of a collision between the high-priority PSSCH and a low-priority PSSCH can be reduced, thereby ensuring QoS of the high-priority PSSCH and improving the QoS of the high-priority PSSCH.

With reference to a first implementation of the first aspect, the first resource pool information further indicates random selection configuration information, and the random selection configuration information includes: enabling the random-selection-based resource determination mechanism, or disabling the random-selection-based resource determination mechanism. Therefore, when it is determined that the first priority value is less than the first priority threshold, whether the first resource pool information indicates the enabling the random-selection-based resource determination mechanism needs to be further determined. Therefore, when the first resource pool information indicates the enabling the random-selection-based resource determination mechanism, it may be determined to determine, in the random-selection-based resource determination mechanism in the first resource pool, a resource for sending the PSSCH; and when the first resource pool information indicates the disabling the random-selection-based resource determination mechanism, it is determined to determine, in the random-selection-based resource determination mechanism in the second resource pool, a resource for sending the PSSCH. In addition, when the first resource pool information indicates the disabling the random-selection-based resource determination mechanism. Because random selection is disabled in the first resource pool, it is determined to determine, in the random-selection-based resource determination mechanism in the second resource pool, a resource for sending the PSSCH.

In this implementation, in a resource determination mechanism of determining whether the first resource pool information can be used for random selection based on the random selection configuration information, for a high-priority PSSCH, when the random-selection-based resource determination mechanism is enabled for the first resource pool, a corresponding resource for sending the high-priority PSSCH can be determined in the random-selection-based resource determination mechanism in the first resource pool, thereby further improving QoS of the high-priority PSSCH. In addition, when the random-selection-based resource determination mechanism is disabled, the resource for sending the PSSCH is determined in the random-selection-based resource determination mechanism in the second resource pool, which can ensure that the resource can be sent smoothly, and the resource for sending the PSSCH is limited to being in the random-selection-based resource determination mechanism in the resource pool. Therefore, implementability of this solution is improved.

With reference to a second implementation of the first aspect, the first resource pool information further indicates preemption information, and the preemption information includes enabling a preemption-based resource determination mechanism or disabling a preemption-based resource determination mechanism. Therefore, when the first resource pool information indicates the enabling the preemption-based resource determination mechanism, whether the first priority value is less than the first priority threshold needs to be further determined. When the first priority value is less than the first priority threshold, it may be determined to determine, in the random-selection-based resource determination mechanism in the first resource pool, a resource for sending the PSSCH; and when the first priority value is greater than or equal to the first priority threshold, it is determined to determine, in the random-selection-based resource determination mechanism in the second resource pool, a resource for sending the PSSCH. In addition, when the first resource pool information indicates the disabling the preemption-based resource determination mechanism, preemption is allowed to be enabled in the first resource pool. In this case, the first priority value is not considered, that is, it is determined to determine, in the random-selection-based resource determination mechanism in the second resource pool, a resource for sending the PSSCH.

In this implementation, a trigger condition of the random-selection-based resource determination mechanism is associated with a trigger condition of the preemption-based resource determination mechanism. When preemption is allowed in the first resource pool, random selection can be performed only when the first priority value is less than the first priority threshold. A condition requirement for determining, in the random-selection-based resource determination mechanism in the first resource pool, a resource for sending a PSSCH is improved, and a quantity for sending the PSSCH that are determined in the random-selection-based resource determination mechanism is limited, thereby improving reliability of sending a resource in a high-priority PSSCH in the random-selection-based resource determination mechanism. In this way, QoS of the high-priority PSSCH is further improved.

With reference to a third implementation of the first aspect, the first resource pool information further indicates preemption information, and the preemption information includes enabling a preemption-based resource determination mechanism or disabling a preemption-based resource determination mechanism. In this implementation, only when the first resource pool information indicates the disabling the preemption-based resource determination mechanism, that is, when preemption is not allowed to be enabled in the first resource pool, whether the first priority value is less than the first priority threshold needs to be further determined. Therefore, when the first priority value is less than the first priority threshold, it may be determined to determine, in the random-selection-based resource determination mechanism in the first resource pool, a resource for sending the PSSCH; and when the first priority value is greater than or equal to the first priority threshold, it is determined to determine, in the random-selection-based resource determination mechanism in the second resource pool, a resource for sending the PSSCH. In addition, when the first resource pool information indicates the enabling the preemption-based resource determination mechanism, preemption is allowed to be enabled in the first resource pool, and the resource for sending the PSSCH cannot be determined in the random-selection-based resource determination mechanism in the first resource pool. In this case, the first priority value is not considered, that is, it is determined to determine, in the random-selection-based resource determination mechanism in the second resource pool, a resource for sending the PSSCH.

In this implementation, because the random-selection-based resource determination mechanism affects the full-sensing-selection-based resource determination mechanism in performance, and preemption may also affect the full-sensing-selection-based resource determination mechanism, when the first resource pool information indicates the disabling the preemption-based resource determination mechanism, and the first priority value is less than the first priority threshold, it may be determined to determine, in the random-selection-based resource determination mechanism in the first resource pool, a corresponding resource for sending the high-priority PSSCH. In each of other cases, the resource for sending the PSSCH is determined in the random-selection-based resource determination mechanism in the second resource pool. Therefore, interference and conflict impact between random selection and preemption can be reduced, thereby reducing a collision of sending a high-priority PSSCH in the random-selection-based resource determination mechanism, and further ensuring QoS of the high-priority PSSCH.

With reference to a fourth implementation of the first aspect, the first resource pool information further indicates partial-sensing selection configuration information, and the partial-sensing selection configuration information includes enabling the partial-sensing-selection-based resource determination mechanism or disabling the partial-sensing-selection-based resource determination mechanism. Similar to the first implementation of the first aspect, after it is determined that the first priority value is less than the first priority threshold, whether the first resource pool information indicates enabling the partial-sensing-selection-based resource determination mechanism needs to be further determined. Therefore, when the first resource pool information indicates the enabling the partial-sensing-selection-based resource determination mechanism, it may be determined to determine, in the partial-sensing-selection-based resource determination mechanism in the first resource pool, a resource for sending the PSSCH; and when the first resource pool information indicates the disabling partial-sensing-selection-based resource determination mechanism, it is determined to determine, in the partial-sensing-selection-based resource determination mechanism in the second resource pool, a resource for sending the PSSCH. In addition, when the first resource pool information indicates the disabling partial-sensing-selection-based resource determination mechanism. Because partial-sensing selection is disabled in the first resource pool, it is determined to determine, in the partial-sensing-selection-based resource determination mechanism in the second resource pool, a resource for sending the PSSCH.

In this implementation, in a resource determination mechanism of determining whether the first resource pool information can be used for partial-sensing selection based on the partial-sensing selection configuration information, for a high-priority PSSCH, when the partial-sensing-selection-based resource determination mechanism is enabled for the first resource pool, a corresponding resource for sending the high-priority PSSCH can be determined in the partial-sensing-selection-based resource determination mechanism in the first resource pool, thereby further improving QoS of the high-priority PSSCH. In addition, when the partial-sensing-selection-based resource determination mechanism is disabled, the resource for sending the PSSCH is determined in the partial-sensing-selection-based resource determination mechanism in the second resource pool, which can ensure that the resource can be sent smoothly, and the resource for sending the PSSCH is limited to being in the partial-sensing-selection-based resource determination mechanism in the resource pool. Therefore, implementability of this solution is improved.

With reference to a fifth implementation of the first aspect, the first resource pool information further indicates preemption information, and the preemption information includes enabling a preemption-based resource determination mechanism or disabling a preemption-based resource determination mechanism. Similar to the second implementation, when the first resource pool information indicates the enabling the preemption-based resource determination mechanism, whether the first priority value is less than the first priority threshold needs to be further determined. When the first priority value is less than the first priority threshold, it may be determined to determine, in the partial-sensing-selection-based resource determination mechanism in the first resource pool, a resource for sending the PSSCH; and when the first priority value is greater than or equal to the first priority threshold, it is determined to determine, in the partial-sensing-selection-based resource determination mechanism in the second resource pool, a resource for sending the PSSCH. In addition, the first resource pool information indicates the disabling the preemption-based resource determination mechanism. In this case, the first priority value is not considered, that is, it is determined to determine, in the partial-sensing-selection-based resource determination mechanism in the second resource pool, a resource for sending the PSSCH.

In this implementation, a trigger condition of the partial-sensing-selection-based resource determination mechanism is associated with a trigger condition of the preemption-based resource determination mechanism. When preemption is allowed in the first resource pool, partial-sensing selection can be performed only when the first priority value is less than the first priority threshold. A condition requirement for determining, in the partial-sensing-selection-based resource determination mechanism in the first resource pool, a resource for sending a PSSCH is improved, and a quantity for sending the PSSCH that are determined in the partial-sensing-selection-based resource determination mechanism is limited, thereby improving reliability of sending a resource in a high-priority PSSCH in the partial-sensing-selection-based resource determination mechanism. In this way, QoS of the high-priority PSSCH is further improved.

With reference to a sixth implementation of the first aspect, the first resource pool information further indicates preemption information, and the preemption information includes enabling a preemption-based resource determination mechanism or disabling a preemption-based resource determination mechanism. Similar to the third implementation, only when the first resource pool information indicates the disabling the preemption-based resource determination mechanism, that is, when preemption is not allowed to be enabled in the first resource pool, whether the first priority value is less than the first priority threshold needs to be further determined. Therefore, when the first priority value is less than the first priority threshold, it may be determined to determine, in the partial-sensing-selection-based resource determination mechanism in the first resource pool, a resource for sending the PSSCH; and when the first priority value is greater than or equal to the first priority threshold, it is determined to determine, in the partial-sensing-selection-based resource determination mechanism in the second resource pool, a resource for sending the PSSCH. In addition, the first resource pool information indicates the enabling the preemption-based resource determination mechanism. In this case, the first priority value is not considered, that is, it is determined to determine, in the partial-sensing-selection-based resource determination mechanism in the second resource pool, a resource for sending the PSSCH.

In this implementation, because the partial-sensing-selection-based resource determination mechanism affects the full-sensing-selection-based resource determination mechanism in performance, and preemption may also affect the full-sensing-selection-based resource determination mechanism, when the first resource pool information indicates the disabling the preemption-based resource determination mechanism, and the first priority value is less than the first priority threshold, it may be determined to determine, in the partial-sensing-selection-based resource determination mechanism in the first resource pool, a corresponding resource for sending the high-priority PSSCH. In each of other cases, the resource for sending the PSSCH is determined in the partial-sensing-selection-based resource determination mechanism in the second resource pool. Therefore, interference and conflict impact between partial-sensing selection and preemption can be reduced, thereby reducing a collision of sending a high-priority PSSCH in the partial-sensing-selection-based resource determination mechanism, and further ensuring QoS of the high-priority PSSCH.

With reference to a seventh implementation of the first aspect, when a transmit power corresponding to the PSSCH is less than or equal to a transmit power threshold, the step of determining, in the partial-sensing-selection-based resource determination mechanism and/or the random-selection-based resource determination mechanism in the first resource pool, a resource for sending the PSSCH is performed.

In this implementation, a condition for performing the step of determining, in the partial-sensing-selection-based resource determination mechanism and/or the random-selection-based resource determination mechanism in the first resource pool, a resource for sending the PSSCH may be limited. The PSSCH is sent in the first resource pool only when a condition that the transmit power corresponding to the PSSCH is less than or equal to the transmit power threshold is met, thereby improving implementability of this solution.

With reference to an eighth implementation of the first aspect, when a battery headroom of a terminal apparatus is less than or equal to a battery level threshold, the step of determining, in the partial-sensing-selection-based resource determination mechanism and/or the random-selection-based resource determination mechanism in the first resource pool, a resource for sending the PSSCH is performed.

In this implementation, another condition for performing the step of determining, in the partial-sensing-selection-based resource determination mechanism and/or the random-selection-based resource determination mechanism in the first resource pool, a resource for sending the PSSCH may be limited. The PSSCH is sent in the first resource pool only when a condition that the battery headroom is less than or equal to the battery level threshold is met. Therefore, implementability of this solution is improved. In addition, another possibility of performing this step is provided. Therefore, flexibility of this solution is improved.

With reference to a ninth implementation of the first aspect, when determining, based on an environment state, to enter a target state, a terminal apparatus performs the step of determining, in the partial-sensing-selection-based resource determination mechanism and/or the random-selection-based resource determination mechanism in the first resource pool, a resource for sending the PSSCH.

In this implementation, still another condition for performing the step of determining, in the partial-sensing-selection-based resource determination mechanism and/or the random-selection-based resource determination mechanism in the first resource pool, a resource for sending the PSSCH may be limited. The PSSCH is sent in the first resource pool only when a condition that the terminal apparatus determines, based on the environment state, to enter the target state is met. Therefore, implementability of this solution is improved. In addition, still another possibility of performing this step is provided. Therefore, flexibility of this solution is improved.

With reference to a tenth implementation of the first aspect, the transmit power threshold may be determined in different manners. For example, the transmit power threshold may be obtained based on configuration of a network apparatus, obtained based on preconfiguration, obtained based on an indication by another terminal apparatus by using sidelink control information (SCI), or obtained based on configuration of another terminal apparatus by using a sidelink Media Access Control control element (SL MAC CE). In actual application, the transmit power threshold may alternatively be obtained by configuration of another terminal apparatus through sidelink communication radio resource control, obtained based on factory setting, or obtained based on predefinition. Therefore, a battery level threshold may need to be flexibly determined according to an actual situation.

In this implementation, the transmit power threshold may be determined in different manners, so as to improve flexibility of determining the transmit power threshold. Therefore, flexibility of performing the step of sending the PSSCH in the first resource pool can be improved, thereby improving flexibility of this solution.

With reference to an eleventh implementation of the first aspect, the transmit power threshold may be further related to at least one of a congestion control parameter and a quality of service parameter. The congestion control parameter may be a channel busy ratio (CRB), and the quality of service parameter includes, but is not limited to, a communication distance, geographical location information, PSSCH priority information, and the like. The communication distance may include a minimum communication distance. The geographical location information may include zone identity (ID) indication information. This is not limited herein.

In this implementation, the transmit power threshold is related to different types of parameters, and different types of parameters may be adjusted and selected according to an actual situation. Therefore, implementability and flexibility of the transmit power threshold can be improved. Therefore, implementability and flexibility of performing the step of sending the PSSCH in the first resource pool are improved, thereby improving implementability and flexibility of this solution.

With reference to a twelfth implementation of the first aspect, the battery level threshold may be determined in different manners. For example, the battery level threshold may be obtained based on configuration of a network apparatus, obtained based on preconfiguration, obtained based on an indication by another terminal apparatus by using SCI, or obtained based on configuration of another terminal apparatus by using an SL MAC CE. In actual application, the battery level threshold may alternatively be obtained based on configuration of another terminal apparatus through sidelink communication radio resource control, obtained based on factory setting, or obtained based on predefinition. Therefore, a battery level threshold may need to be flexibly determined according to an actual situation.

In this implementation, the battery level threshold may be determined in different manners, so as to improve flexibility of determining the battery level threshold. Therefore, flexibility of performing the step of sending the PSSCH in the first resource pool is improved, thereby improving flexibility of this solution.

With reference to a thirteenth implementation of the first aspect, the target state may be that the terminal apparatus is in a non-charging mode, that is, whether the terminal apparatus is powered by an external power supply. If the terminal apparatus is in the non-charging mode, for example, if a handheld terminal apparatus leaves a vehicle and disconnects from a vehicle-mounted power supply, the PSSCH is sent in the first resource pool. If the terminal apparatus is in a charging mode, for example, if a handheld terminal apparatus enters the vehicle and connects to the vehicle-mounted power supply, the PSSCH is sent in the second resource pool. In addition, the target state may alternatively be that a speed corresponding to the terminal apparatus is greater than or equal to a speed threshold, that is, when the terminal apparatus is at a high speed in a period of time, the terminal apparatus considers that an external power supply can be provided. For example, if a handheld terminal apparatus enters the vehicle and runs on a highway, it may be determined that, in the first resource pool, the resource for sending the PSSCH is determined in the partial-sensing-selection-based resource determination mechanism and/or the random-selection-based resource determination mechanism. When the terminal apparatus is at a low speed in a period of time, for example, when the handheld terminal apparatus leaves the vehicle for walking or using a bicycle, it may be determined that, in the second resource pool, the resource for sending the PSSCH is determined in the partial-sensing-selection-based resource determination mechanism and/or the random-selection-based resource determination mechanism. The target state and application scenarios are not exhaustively listed herein. A target state may need to be flexibly determined based on an actual situation and an environment state.

In this implementation, the target state is changed based on an environment, and when the terminal apparatus is in a non-access environment, a state is determined. Therefore, flexibility of the target state is improved, flexibility of performing the step of sending the PSSCH in the first resource pool is improved, and flexibility of this solution is further improved.

With reference to a fourteenth implementation of the first aspect, the first priority threshold may be obtained in different manners, for example, may be provided by the resource pool configuration information, or provided by the first resource pool information. In actual application, the first priority threshold may alternatively be predefined or preconfigured. Therefore, the first priority threshold needs to be flexibly determined according to an actual situation.

In this implementation, the first priority threshold may be determined based on an actual situation in different manners, so as to improve flexibility of the first priority threshold. Therefore, it may be determined, based on the actual situation, that the first priority value is compared with the first priority threshold. Therefore, flexibility of determining, in the first resource pool, a resource for sending the PSSCH in the partial-sensing-selection-based resource determination mechanism and/or the random-selection-based resource determination mechanism is improved, thereby improving flexibility of this solution.

With reference to a fifteenth implementation of the first aspect, the first resource pool information may further indicate preemption information, and the preemption information may also provide the first priority threshold.

In this implementation, the first priority threshold is provided by using the preemption information, so that reliability of the first priority threshold determined when the first resource pool information indicates the preemption information can be improved, and reliability of a resource for sending a high-priority PSSCH can be improved.

With reference to a sixteenth implementation of the first aspect, the resource pool configuration information further indicates N sending resource pools and P receiving resource pools, and a quantity of receiving resource pools is greater than or equal to a quantity of sending resource pools, that is, P is greater than or equal to N.

In this implementation, a total quantity of configured receiving resource pools is greater than or equal to a total quantity of configured sending resource pools, to ensure that one terminal apparatus can receive, as much as possible, data sent from different sending resource pools.

With reference to a seventeenth implementation of the first aspect, a value of bandwidth of a frequency domain resource for initial transmission of the PSSCH that is sent in a random selection manner in the first resource pool is one subchannel, that is, it is reserved by using SCI that a bandwidth of a frequency domain resource for retransmission after the initial transmission is one or more subchannels. The SCI may carry information about a quantity of subchannels occupied by a PSCCH, that is, a quantity of subchannels required for subsequently retransmitting the PSSCH. Initial transmission uses a fixed minimum frequency-domain scheduling unit, that is, a subchannel.

In this implementation, because a value of bandwidth of a frequency domain resource for initial transmission is one subchannel, and random sending is performed, a collision probability of initial transmission in frequency domain can be reduced. A frequency domain resource for retransmission indicated by using SCI is not limited by a quantity of subchannels, and an appropriate quantity of subchannels may be occupied based on an actual data size, including more than one subchannel. Another terminal apparatus (other than the first terminal apparatus) may obtain frequency domain indication information of the SCI through full sensing or partial sensing, to avoid a collision in resource selection, thereby improving transmission reliability.

According to a second aspect, the embodiments may provide a configuration method for resource pool configuration information. The method includes: sending, to a terminal apparatus, resource pool configuration information including first resource pool information and second resource pool information, where the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes a partial-sensing-selection-based resource determination mechanism and/or a random-selection-based resource determination mechanism. In this way, the terminal apparatus can perform the method in the first aspect, obtain a first priority value corresponding to a physical sidelink shared channel PSSCH, and when the first priority value is less than a first priority threshold, determine, in the partial-sensing-selection-based resource determination mechanism and/or the random-selection-based resource determination mechanism in the first resource pool, a resource for sending the PSSCH; or when the first priority value is greater than or equal to the first priority threshold, determine, in the partial-sensing-selection-based resource determination mechanism and/or the random-selection-based resource determination mechanism in the second resource pool, a resource for sending the PSSCH.

In this implementation, a network apparatus sends, to the terminal apparatus, the resource pool configuration information that includes the first resource pool information and the second resource pool information. Because a smaller priority value indicates a higher priority, when the first priority value is less than the first priority threshold, for a high-priority PSSCH, the terminal apparatus may determine, in the partial-sensing-selection-based resource determination mechanism and/or the random-selection-based resource determination mechanism in the first resource pool, a resource for sending the PSSCH. A probability of a collision between the high-priority PSSCH and a low-priority PSSCH can be reduced, thereby ensuring QoS of the high-priority PSSCH and improving the QoS of the high-priority PSSCH.

With reference to a first implementation of the second aspect, the first resource pool information configured by the network apparatus further indicates random selection configuration information, and the random selection configuration information includes: enabling the random-selection-based resource determination mechanism, or disabling the random-selection-based resource determination mechanism. Therefore, in the first implementation of the first aspect, under different conditions, the terminal apparatus may determine, in the random-selection-based resource determination mechanism in the first resource pool, the resource for sending the PSSCH, or determine, in the random-selection-based resource determination mechanism in the second resource pool, the resource for sending the PSSCH.

In this implementation, the network apparatus configures, for the terminal apparatus, the first resource pool information that can indicate the random selection configuration information, so that the terminal apparatus can further improve QoS of the high-priority PSSCH based on the first resource pool information. In addition, it can be ensured that the resource can be sent smoothly, and the resource for sending the PSSCH is limited to being in the random-selection-based resource determination mechanism in the resource pool. Therefore, implementability of this solution is improved.

With reference to a second implementation of the second aspect, the first resource pool information configured by the network apparatus further indicates preemption information, and the preemption information includes enabling a preemption-based resource determination mechanism or disabling a preemption-based resource determination mechanism. Therefore, in the second implementation of the first aspect, under different conditions, the terminal apparatus may determine, in the random-selection-based resource determination mechanism in the first resource pool, the resource for sending the PSSCH, or determine, in the random-selection-based resource determination mechanism in the second resource pool, the resource for sending the PSSCH.

In this implementation, the network apparatus configures, for the terminal apparatus, the first resource pool information that can indicate the preemption information. The terminal apparatus may improve, based on the first resource pool information, a condition requirement for determining, in the random-selection-based resource determination mechanism in the first resource pool, a resource for sending a PSSCH is improved, and a quantity for sending the PSSCH that are determined in the random-selection-based resource determination mechanism is limited, thereby improving reliability of sending a resource in a high-priority PSSCH in the random-selection-based resource determination mechanism. In this way, QoS of the high-priority PSSCH is further improved.

With reference to a third implementation of the second aspect, the first resource pool information configured by the network apparatus further indicates preemption information, and the preemption information includes enabling a preemption (pre-emption)-based resource determination mechanism or disabling a preemption-based resource determination mechanism. Therefore, in the third implementation of the first aspect, under different conditions, the terminal apparatus may determine, in the random-selection-based resource determination mechanism in the first resource pool, the resource for sending the PSSCH, or determine, in the random-selection-based resource determination mechanism in the second resource pool, the resource for sending the PSSCH.

In this implementation, because the random-selection-based resource determination mechanism affects the full-sensing-selection-based resource determination mechanism in performance, and preemption may also affect the full-sensing-selection-based resource determination mechanism, the network apparatus configures, for the terminal apparatus, the first resource pool information that can indicate the preemption information, and the terminal apparatus can reduce interference and conflict impact between random selection and preemption based on the first resource pool information, thereby reducing a collision of sending a high-priority PSSCH in the random-selection-based resource determination mechanism, and further ensuring QoS of the high-priority PSSCH.

With reference to a fourth implementation of the second aspect, the first resource pool information configured by the network apparatus further indicates partial-sensing selection configuration information, and the partial-sensing selection configuration information includes enabling the partial-sensing-selection-based resource determination mechanism or disabling the partial-sensing-selection-based resource determination mechanism. Therefore, in the fourth implementation, under different conditions, the terminal apparatus may determine, in the random-selection-based resource determination mechanism in the first resource pool, the resource for sending the PSSCH, or determine, in the random-selection-based resource determination mechanism in the second resource pool, the resource for sending the PSSCH.

In this implementation, the network apparatus configures, for the terminal apparatus, the first resource pool information that can indicate the partial-sensing selection configuration information, so that the terminal apparatus can improve QoS of the high-priority PSSCH based on the first resource pool information. In addition, it can be further ensured that the terminal apparatus can successfully send a resource, and the resource for sending the PSSCH is limited to being in the partial-sensing-selection-based resource determination mechanism in the resource pool. Therefore, implementability of this solution is improved.

With reference to a fifth implementation of the second aspect, the first resource pool information configured by the network apparatus further indicates preemption information, and the preemption information includes enabling a preemption-based resource determination mechanism or disabling a preemption-based resource determination mechanism. Similar to the second implementation of the second aspect, in the fifth implementation of the second aspect, under different conditions, the terminal apparatus may determine, in the random-selection-based resource determination mechanism in the first resource pool, the resource for sending the PSSCH, or determine, in the random-selection-based resource determination mechanism in the second resource pool, the resource for sending the PSSCH.

In this implementation, a trigger condition of the partial-sensing-selection-based resource determination mechanism is associated with a trigger condition of the preemption-based resource determination mechanism. When preemption is allowed in the first resource pool, partial-sensing selection can be performed only when the first priority value is less than the first priority threshold. A condition requirement for determining, in the partial-sensing-selection-based resource determination mechanism in the first resource pool, a resource for sending a PSSCH is improved, and a quantity for sending the PSSCH that are determined in the partial-sensing-selection-based resource determination mechanism is limited, thereby improving reliability of sending a resource in a high-priority PSSCH in the partial-sensingselection-based resource determination mechanism. In this way, QoS of the high-priority PSSCH is further improved.

With reference to a sixth implementation of the second aspect, the first resource pool information configured by the network apparatus further indicates preemption information, and the preemption information includes enabling a preemption-based resource determination mechanism or disabling a preemption-based resource determination mechanism. Similar to the third implementation of the second aspect, in the sixth implementation of the second aspect, under different conditions, the terminal apparatus may determine, in the random-selection-based resource determination mechanism in the first resource pool, the resource for sending the PSSCH, or determine, in the random-selection-based resource determination mechanism in the second resource pool, the resource for sending the PSSCH.

In this implementation, because the partial-sensing-selection-based resource determination mechanism affects the full-sensing-selection-based resource determination mechanism in performance, and preemption may also affect the full-sensing-selection-based resource determination mechanism, the terminal apparatus can reduce interference and conflict impact between partial-sensing selection and preemption, thereby reducing a collision of sending a high-priority PSSCH in the partial-sensing-selection-based resource determination mechanism, and further ensuring QoS of the high-priority PSSCH.

With reference to a seventh implementation of the second aspect, the network apparatus may provide the first priority threshold in the resource pool configuration information, or may provide the first priority threshold in the first resource pool information.

In this implementation, the first priority threshold may be determined in different manners based on an actual situation, to improve flexibility of the first priority threshold, thereby improving flexibility of this solution.

With reference to an eighth implementation of the second aspect, when the first resource pool information may further indicate preemption information, the preemption information may also provide the first priority threshold.

In this implementation, the first priority threshold is provided by using the preemption information, so that reliability of the first priority threshold determined when the first resource pool information indicates the preemption information can be improved, and reliability of a resource for sending a high-priority PSSCH can be improved.

With reference to a ninth implementation of the second aspect, the resource pool configuration information further indicates N sending resource pools and P receiving resource pools, and a quantity of receiving resource pools is greater than or equal to a quantity of sending resource pools, that is, P is greater than or equal to N.

In this implementation, a total quantity of receiving resource pools configured by the network apparatus is greater than or equal to a total quantity of configured sending resource pools, which can ensure that one terminal apparatus can receive, as much as possible, data sent from different sending resource pools.

According to a third aspect, the embodiments may provide a configuration method for resource pool configuration information. The method includes: First, resource pool configuration information including first resource pool information and second resource pool information is obtained, where the resource pool configuration information may be obtained based on configuration of an SL-BWP, the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes at least one of a partial-sensing-selection-based resource determination mechanism and a random-selection-based resource determination mechanism. It should be understood that, in actual application, the resource determination mechanism of the first resource pool may further include partial-sensing selection and/or random selection, and the second resource pool can be used only for partial-sensing selection and/or random selection. This is not limited herein. In addition, the first resource pool information can further indicate disabling the random-selection-based resource determination mechanism. In this case, it is determined to determine, in the random-selection-based resource determination mechanism in the second resource pool, a resource for sending a PSSCH.

In this implementation, when the random-selection-based resource determination mechanism is disabled, the resource for sending the PSSCH is determined in the random-selection-based resource determination mechanism in the second resource pool, which can ensure that the resource can be sent smoothly, and the resource for sending the PSSCH is limited to being in the random-selection-based resource determination mechanism in the resource pool. Therefore, implementability of this solution is improved.

According to a fourth aspect, the embodiments may provide a configuration method for resource pool configuration information. The method includes: First, resource pool configuration information including first resource pool information and second resource pool information is obtained, where the resource pool configuration information may be obtained based on configuration of an SL-BWP, the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes at least one of a partial-sensing-selection-based resource determination mechanism and a random-selection-based resource determination mechanism. It should be understood that, in actual application, the resource determination mechanism of the first resource pool may further include partial-sensing selection and/or random selection, and the second resource pool can be used only for partial-sensing selection and/or random selection. This is not limited herein. It should be understood that, in actual application, the resource determination mechanism of the first resource pool may further include partial-sensing selection and/or random selection, and the second resource pool can be used only for partial-sensing selection and/or random selection. This is not limited herein. In addition, the first resource pool information can further indicate the disabling the preemption-based resource determination mechanism. In this case, it is determined to determine, in the random-selection-based resource determination mechanism in the second resource pool, a resource for sending the PSSCH.

In this implementation, when the random-selection-based resource determination mechanism is disabled, a quantity for sending a PSSCH determined in the random-selection-based resource determination mechanism is limited, thereby improving reliability of a resource for sending a high-priority PSSCH in the random-selection-based resource determination mechanism, and further improving QoS of the high-priority PSSCH.

According to a fifth aspect, the embodiments may provide a configuration method for resource pool configuration information. The method includes: First, resource pool configuration information including first resource pool information and second resource pool information is obtained, where the resource pool configuration information may be obtained based on configuration of an SL-BWP, the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes at least one of a partial-sensing-selection-based resource determination mechanism and a random-selection-based resource determination mechanism. It should be understood that, in actual application, the resource determination mechanism of the first resource pool may further include partial-sensing selection and/or random selection, and the second resource pool can be used only for partial-sensing selection and/or random selection. This is not limited herein. It should be understood that, in actual application, the resource determination mechanism of the first resource pool may further include partial-sensing selection and/or random selection, and the second resource pool can be used only for partial-sensing selection and/or random selection. This is not limited herein. In addition, when the first resource pool information indicates enabling a preemption-based resource determination mechanism, determining, in the random-selection-based resource determination mechanism in the second resource pool, a resource for sending a PSSCH.

In this implementation, because the random-selection-based resource determination mechanism affects the full-sensing-selection-based resource determination mechanism in performance, and preemption may also affect the full-sensing-selection-based resource determination mechanism, interference and conflict impact between random selection and preemption can be reduced, thereby reducing a collision of sending a high-priority PSSCH in the random-selection-based resource determination mechanism, and further ensuring QoS of the high-priority PSSCH.

According to a sixth aspect, the embodiments may provide a configuration method for resource pool configuration information. The method includes: First, resource pool configuration information including first resource pool information and second resource pool information is obtained, where the resource pool configuration information may be obtained based on configuration of an SL-BWP, the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes at least one of a partial-sensing-selection-based resource determination mechanism and a random-selection-based resource determination mechanism. It should be understood that, in actual application, the resource determination mechanism of the first resource pool may further include partial-sensing selection and/or random selection, and the second resource pool can be used only for partial-sensing selection and/or random selection. This is not limited herein. It should be understood that, in actual application, the resource determination mechanism of the first resource pool may further include partial-sensing selection and/or random selection, and the second resource pool can be used only for partial-sensing selection and/or random selection. This is not limited herein. In addition, when the first resource pool information indicates disabling the partial-sensing-selection-based resource determination mechanism. Because partial-sensing selection is disabled in the first resource pool, it is determined to determine, in the partial-sensing-selection-based resource determination mechanism in the second resource pool, a resource for sending a PSSCH.

In this implementation, when the partial-sensing-selection-based resource determination mechanism is disabled, the resource for sending the PSSCH is determined in the partial-sensing-selection-based resource determination mechanism in the second resource pool, which can ensure that the resource can be sent smoothly, and the resource for sending the PSSCH is limited to being in the partial-sensing-selection-based resource determination mechanism in the resource pool. Therefore, implementability of this solution is improved.

According to a seventh aspect, the embodiments may provide a configuration method for resource pool configuration information. The method includes: First, resource pool configuration information including first resource pool information and second resource pool information is obtained, where the resource pool configuration information may be obtained based on configuration of an SL-BWP, the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes at least one of a partial-sensing-selection-based resource determination mechanism and a random-selection-based resource determination mechanism. It should be understood that, in actual application, the resource determination mechanism of the first resource pool may further include partial-sensing selection and/or random selection, and the second resource pool can be used only for partial-sensing selection and/or random selection. This is not limited herein. It should be understood that, in actual application, the resource determination mechanism of the first resource pool may further include partial-sensing selection and/or random selection, and the second resource pool can be used only for partial-sensing selection and/or random selection. This is not limited herein. In addition, the first resource pool information indicates disabling a preemption-based resource determination mechanism. In this case, a first priority value is not considered, that is, it is determined to determine, in the partial-sensing-selection-based resource determination mechanism in the second resource pool, a resource for sending a PSSCH.

In this implementation, a quantity for sending a PSSCH determined in the partial-sensing-selection-based resource determination mechanism is limited, thereby improving reliability of a resource for sending a high-priority PSSCH in the partial-sensing-selection-based resource determination mechanism, and further improving QoS of the high-priority PSSCH.

According to an eighth aspect, the embodiments may provide a configuration method for resource pool configuration information. The method includes: First, resource pool configuration information including first resource pool information and second resource pool information is obtained, where the resource pool configuration information may be obtained based on configuration of an SL-BWP, the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes at least one of a partial-sensing-selection-based resource determination mechanism and a random-selection-based resource determination mechanism. It should be understood that, in actual application, the resource determination mechanism of the first resource pool may further include partial-sensing selection and/or random selection, and the second resource pool can be used only for partial-sensing selection and/or random selection. This is not limited herein. It should be understood that, in actual application, the resource determination mechanism of the first resource pool may further include partial-sensing selection and/or random selection, and the second resource pool can be used only for partial-sensing selection and/or random selection. This is not limited herein. In addition, the first resource pool information indicates enabling a preemption-based resource determination mechanism. In this case, a first priority value is not considered, that is, it is determined to determine, in the partial-sensing-selection-based resource determination mechanism in the second resource pool, a resource for sending a PSSCH.

In this implementation, because the partial-sensing-selection-based resource determination mechanism affects the full-sensing-selection-based resource determination mechanism in performance, and preemption may also affect the full-sensing-selection-based resource determination mechanism, interference and conflict impact between partial-sensing selection and preemption can be reduced, thereby reducing a collision of sending a high-priority PSSCH in the partial-sensing-selection-based resource determination mechanism, and further ensuring QoS of the high-priority PSSCH.

According to a ninth aspect, the embodiments may provide a data transmission apparatus. The data transmission apparatus includes an obtaining module and a determining module. The obtaining module is configured to obtain resource pool configuration information including first resource pool information and second resource pool information, where the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes partial-sensing selection and random selection; and the obtaining module is further configured to obtain a first priority value corresponding to a physical sidelink shared channel PSSCH. The determining module is configured to: when the first priority value is less than a first priority threshold, determine, in the partial-sensing-selection-based resource determination mechanism and/or the random-selection-based resource determination mechanism in the first resource pool, a resource for sending the PSSCH; and the determining module is further configured to: when the first priority value is greater than or equal to the first priority threshold, determine, in the partial-sensing-selection-based resource determination mechanism and/or the random-selection-based resource determination mechanism in the second resource pool, a resource for sending the PSSCH. Because a smaller priority value indicates a higher priority, when the first priority value is less than the first priority threshold, for a high-priority PSSCH, it may be determined to determine, in the partial-sensing-selection-based resource determination mechanism and/or the random-selection-based resource determination mechanism in the first resource pool, a resource for sending the PSSCH. A probability of a collision between the high-priority PSSCH and a low-priority PSSCH can be reduced, thereby ensuring QoS of the high-priority PSSCH and improving the QoS of the high-priority PSSCH.

With reference to a first implementation of the ninth aspect, the first resource pool information further indicates random selection configuration information, and the random selection configuration information includes: enabling the random-selection-based resource determination mechanism, or disabling the random-selection-based resource determination mechanism. The determining module is further configured to: when the first priority value is less than the first priority threshold, and the first resource pool information indicates the enabling the random-selection-based resource determination mechanism, determine, in the random-selection-based resource determination mechanism in the first resource pool, a resource for sending the PSSCH; the determining module is further configured to: when the first priority value is greater than or equal to the first priority threshold, and the first resource pool information indicates the enabling the random-selection-based resource determination mechanism, determine, in the random-selection-based resource determination mechanism in the second resource pool, a resource for sending the PSSCH; or the determining module is further configured to: when the first resource pool information indicates the disabling the random-selection-based resource determination mechanism, determine, in the random-selection-based resource determination mechanism in the second resource pool, a resource for sending the PSSCH.

With reference to a second implementation of the ninth aspect, the first resource pool information further indicates preemption information, and the preemption information includes enabling a preemption-based resource determination mechanism or disabling a preemption-based resource determination mechanism. The determining module is further configured to: when the first resource pool information indicates the enabling the preemption-based resource determination mechanism, and the first priority value is less than the first priority threshold, determine, in the random-selection-based resource determination mechanism in the first resource pool, a resource for sending the PSSCH; the determining module is further configured to: when the first resource pool information indicates the enabling the preemption-based resource determination mechanism, and the first priority value is greater than or equal to the first priority threshold, determine, in the random-selection-based resource determination mechanism in the second resource pool, a resource for sending the PSSCH; or the determining module is further configured to: when the first resource pool information indicates the disabling the preemption-based resource determination mechanism, determine, in the random-selection-based resource determination mechanism in the second resource pool, a resource for sending the PSSCH.

With reference to a third implementation of the ninth aspect, the first resource pool information further indicates preemption information, and the preemption information includes enabling a preemption-based resource determination mechanism or disabling a preemption-based resource determination mechanism. The determining module is further configured to: when the first resource pool information indicates the disabling the preemption-based resource determination mechanism, and the first priority value is less than the first priority threshold, determine, in the random-selection-based resource determination mechanism in the first resource pool, a resource for sending the PSSCH; the determining module is further configured to: when the first resource pool information indicates the disabling the preemption-based resource determination mechanism, and the first priority value is greater than or equal to the first priority threshold, determine, in the random-selection-based resource determination mechanism in the second resource pool, a resource for sending the PSSCH; or the determining module is further configured to: when the first resource pool information indicates the enabling the preemption-based resource determination mechanism, determine, in the random-selection-based resource determination mechanism in the second resource pool, a resource for sending the PSSCH.

With reference to a fourth implementation of the ninth aspect, the first resource pool information further indicates partial-sensing selection configuration information, and the partial-sensing selection configuration information includes enabling the partial-sensing-selection-based resource determination mechanism or disabling the partial-sensing-selection-based resource determination mechanism. The determining module is further configured to: when the first priority value is less than the first priority threshold, and the first resource pool information indicates the enabling the partial-sensing-selection-based resource determination mechanism, determine, in the partial-sensing-selection-based resource determination mechanism in the first resource pool, a resource for sending the PSSCH; the determining module is further configured to: when the first priority value is greater than or equal to the first priority threshold, and the resource pool configuration information indicates the enabling the partial-sensing-selection-based resource determination mechanism, determine, in the partial-sensing-selection-based resource determination mechanism in the second resource pool, a resource for sending the PSSCH; or the determining module is further configured to: when the resource pool configuration information indicates the disabling the partial-sensing-selection-based resource determination mechanism, determine, in the partial-sensing-selection-based resource determination mechanism in the second resource pool, a resource for sending the PSSCH.

With reference to a fifth implementation of the ninth aspect, the first resource pool information further indicates preemption information, and the preemption information includes enabling a preemption-based resource determination mechanism or disabling a preemption-based resource determination mechanism. The determining module is further configured to: when the first resource pool information indicates the enabling the preemption-based resource determination mechanism, and the first priority value is less than the first priority threshold, determine, in the partial-sensing-selection-based resource determination mechanism in the first resource pool, a resource for sending the PSSCH; the determining module is further configured to: when the first resource pool information indicates the enabling the preemption-based resource determination mechanism, and the first priority value is greater than or equal to the first priority threshold, determine, in the partial-sensing-selection-based resource determination mechanism in the second resource pool, a resource for sending the PSSCH; or the determining module is further configured to: when the first resource pool information indicates the disabling the preemption-based resource determination mechanism, determine, in the partial-sensing-selection-based resource determination mechanism in the second resource pool, a resource for sending the PSSCH.

With reference to a sixth implementation of the ninth aspect, the first resource pool information further indicates preemption information, and the preemption information includes enabling a preemption-based resource determination mechanism or disabling a preemption-based resource determination mechanism. The determining module is further configured to: when the first resource pool information indicates the disabling the preemption-based resource determination mechanism, and the first priority value is less than the first priority threshold, determine, in the partial-sensing-selection-based resource determination mechanism in the first resource pool, a resource for sending the PSSCH; the determining module is further configured to: when the first resource pool information indicates the disabling the preemption-based resource determination mechanism, and the first priority value is greater than or equal to the first priority threshold, determine, in the partial-sensing-selection-based resource determination mechanism in the second resource pool, a resource for sending the PSSCH; or the determining module is further configured to: when the first resource pool information indicates the enabling the preemption-based resource determination mechanism, determine, in the partial-sensing-selection-based resource determination mechanism in the second resource pool, a resource for sending the PSSCH.

With reference to a seventh implementation of the ninth aspect, the determining module is further configured to: when a transmit power corresponding to the PSSCH is less than or equal to a transmit power threshold, perform the step of determining, in the partial-sensing-selection-based resource determination mechanism and/or the random-selection-based resource determination mechanism in the first resource pool, a resource for sending the PSSCH.

With reference to an eighth implementation of the ninth aspect, the determining module is further configured to: when a battery headroom is less than or equal to a battery level threshold, perform the step of determining, in the partial-sensing-selection-based resource determination mechanism and/or the random-selection-based resource determination mechanism in the first resource pool, a resource for sending the PSSCH.

With reference to a ninth implementation of the ninth aspect, the determining module is further configured to: determine, based on an environment state, to enter a target state, and perform the step of determining, in the partial-sensing-selection-based resource determination mechanism and/or the random-selection-based resource determination mechanism in the first resource pool, a resource for sending the PSSCH.

With reference to a tenth implementation of the ninth aspect, the transmit power threshold is obtained based on configuration of a network apparatus; the transmit power threshold is obtained based on preconfiguration; the transmit power threshold is obtained based on an indication of sidelink control information (SCI); the transmit power threshold is obtained based on configuration of a sidelink Media Access Control control element (SL MAC CE); the transmit power threshold is obtained based on configuration of sidelink communication radio resource control; the transmit power threshold is obtained based on factory setting; or the transmit power threshold is obtained based on predefinition.

With reference to an eleventh implementation of the ninth aspect, the transmit power threshold is related to at least one of a congestion control parameter and a quality of service parameter.

With reference to a twelfth implementation of the ninth aspect, the battery level threshold is obtained based on configuration of a network apparatus; the battery level threshold is obtained based on preconfiguration; the battery level threshold is obtained based on an indication of SCI; the battery level threshold is obtained based on configuration of an SL MAC CE; the battery level threshold is obtained based on configuration of sidelink communication radio resource control; the battery level threshold is obtained based on factory setting; or the battery level threshold is obtained based on predefinition.

With reference to a thirteenth implementation of the ninth aspect, the target state is being in a non-charging mode; or the target state is that a corresponding speed is greater than or equal to a speed threshold.

With reference to a fourteenth implementation of the ninth aspect, the first priority threshold is provided by the resource pool configuration information; the first priority threshold is provided by the first resource pool information; the first priority threshold is predefined; or the first priority threshold is preconfigured.

With reference to a fifteenth implementation of the ninth aspect, the first priority threshold is provided by the pre-emption information.

With reference to a sixteenth implementation of the ninth aspect, the resource pool configuration information further indicates N sending resource pools and P receiving resource pools, N is an integer greater than or equal to 1, P is an integer greater than or equal to 1, and P is greater than or equal to N.

With reference to a seventeenth implementation of the ninth aspect, a value of bandwidth of a frequency domain resource for initial transmission of the PSSCH that is sent in a random selection manner in the first resource pool is one subchannel.

According to a tenth aspect, the embodiments may provide a configuration apparatus for resource pool configuration information. The configuration apparatus for resource pool configuration information includes a sending module. The sending module is configured to send resource pool configuration information including first resource pool information and second resource pool information, where the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes a partial-sensing-selection-based resource determination mechanism and/or a random-selection-based resource determination mechanism. In addition, the resource pool configuration information is used by: when a first priority value is less than a first priority threshold, a data transmission apparatus to determine, in the partial-sensing-selection-based resource determination mechanism and/or the random-selection-based resource determination mechanism in the first resource pool, a resource for sending a PSSCH; or when the first priority value is greater than or equal to the first priority threshold, the data transmission apparatus to determine, in the partial-sensing-selection-based resource determination mechanism and/or the random-selection-based resource determination mechanism in the second resource pool, a resource for sending the PSSCH; and the first priority value is a priority value corresponding to the physical sidelink shared channel PSSCH. Because a smaller priority value indicates a higher priority, when the first priority value is less than the first priority threshold, for a high-priority PSSCH, the data transmission apparatus may determine, in the partial-sensing-selection-based resource determination mechanism and/or the random-selection-based resource determination mechanism in the first resource pool, a resource for sending the PSSCH. A probability of a collision between the high-priority PSSCH and a low-priority PSSCH can be reduced, thereby ensuring QoS of the high-priority PSSCH and improving the QoS of the high-priority PSSCH.

With reference to a first implementation of the tenth aspect, the first resource pool information further indicates random selection configuration information, and the random selection configuration information includes: enabling the random-selection-based resource determination mechanism, or disabling the random-selection-based resource determination mechanism. The resource pool configuration information is further used for: when the first priority value is less than the first priority threshold, and the first resource pool information indicates the enabling the random-selection-based resource determination mechanism, determining, in the random-selection-based resource determination mechanism in the first resource pool, a resource for sending the PSSCH; when the first priority value is greater than or equal to the first priority threshold, and the first resource pool information indicates the enabling the random-selection-based resource determination mechanism, determining, in the random-selection-based resource determination mechanism in the second resource pool, a resource for sending the PSSCH; or when the first resource pool information indicates the disabling the random-selection-based resource determination mechanism, determining, in the random-selection-based resource determination mechanism in the second resource pool, a resource for sending the PSSCH.

With reference to a second implementation of the tenth aspect, the first resource pool information further indicates preemption information, and the preemption information includes enabling a preemption-based resource determination mechanism or disabling a preemption-based resource determination mechanism. The resource pool configuration information is further used for: when the first resource pool information indicates the enabling the preemption-based resource determination mechanism, and the first priority value is less than the first priority threshold, determining, in the random-selection-based resource determination mechanism in the first resource pool, a resource for sending the PSSCH; when the first resource pool information indicates the enabling the preemption-based resource determination mechanism, and the first priority value is greater than or equal to the first priority threshold, determining, in the random-selection-based resource determination mechanism in the second resource pool, a resource for sending the PSSCH; or when the first resource pool information indicates the disabling the preemption-based resource determination mechanism, determining, in the random-selection-based resource determination mechanism in the second resource pool, a resource for sending the PSSCH.

With reference to a third implementation of the tenth aspect, the first resource pool information further indicates preemption information, and the preemption information includes enabling a preemption-based resource determination mechanism or disabling a preemption-based resource determination mechanism. The resource pool configuration information is further used for: when the first resource pool information indicates the disabling the preemption-based resource determination mechanism, and the first priority value is less than the first priority threshold, determining, in the random-selection-based resource determination mechanism in the first resource pool, a resource for sending the PSSCH; when the first resource pool information indicates the disabling the preemption-based resource determination mechanism, and the first priority value is greater than or equal to the first priority threshold, determining, in the random-selection-based resource determination mechanism in the second resource pool, a resource for sending the PSSCH; or when the first resource pool information indicates the enabling the preemption-based resource determination mechanism, determining, in the random-selection-based resource determination mechanism in the second resource pool, a resource for sending the PSSCH.

With reference to a fourth implementation of the tenth aspect, the first resource pool information further indicates partial-sensing selection configuration information, and the partial-sensing selection configuration information includes enabling the partial-sensing-selection-based resource determination mechanism or disabling the partial-sensing-selection-based resource determination mechanism. The resource pool configuration information is further used for: when the first priority value is less than the first priority threshold, and the first resource pool information indicates the enabling the partial-sensing-selection-based resource determination mechanism, determining, in the partial-sensing-selection-based resource determination mechanism in the first resource pool, a resource for sending the PSSCH; when the first priority value is greater than or equal to the first priority threshold, and the resource pool configuration information indicates the enabling the partial-sensing-selection-based resource determination mechanism, determining, in the partial-sensing-selection-based resource determination mechanism in the second resource pool, a resource for sending the PSSCH; or when the resource pool configuration information indicates the disabling the partial-sensing-selection-based resource determination mechanism, determining, in the partial-sensing-selection-based resource determination mechanism in the second resource pool, a resource for sending the PSSCH.

With reference to a fifth implementation of the tenth aspect, the first resource pool information further indicates preemption information, and the preemption information includes enabling a preemption-based resource determination mechanism or disabling a preemption-based resource determination mechanism. The resource pool configuration information is further used for: when the first resource pool information indicates the enabling the preemption-based resource determination mechanism, and the first priority value is less than the first priority threshold, determining, in the partial-sensing-selection-based resource determination mechanism in the first resource pool, a resource for sending the PSSCH; when the first resource pool information indicates the enabling the preemption-based resource determination mechanism, and the first priority value is greater than or equal to the first priority threshold, determining, in the partial-sensing-selection-based resource determination mechanism in the second resource pool, a resource for sending the PSSCH; or when the first resource pool information indicates the disabling the preemption-based resource determination mechanism, determining, in the partial-sensing-selection-based resource determination mechanism in the second resource pool, a resource for sending the PSSCH.

With reference to a sixth implementation of the tenth aspect, the first resource pool information further indicates preemption information, and the preemption information includes enabling a preemption-based resource determination mechanism or disabling a preemption-based resource determination mechanism. The resource pool configuration information is further used for: when the first resource pool information indicates the disabling the preemption-based resource determination mechanism, and the first priority value is less than the first priority threshold, determining, in the partial-sensing-selection-based resource determination mechanism in the first resource pool, a resource for sending the PSSCH; when the first resource pool information indicates the disabling the preemption-based resource determination mechanism, and the first priority value is greater than or equal to the first priority threshold, determining, in the partial-sensing-selection-based resource determination mechanism in the second resource pool, a resource for sending the PSSCH; or when the first resource pool information indicates the enabling the preemption-based resource determination mechanism, determining, in the partial-sensing-selection-based resource determination mechanism in the second resource pool, a resource for sending the PSSCH.

With reference to a seventh implementation of the tenth aspect, the first priority threshold is provided by the resource pool configuration information; or the first priority threshold is provided by the first resource pool information.

With reference to an eighth implementation of the tenth aspect, the first priority threshold is provided by the preemption information.

With reference to a ninth implementation of the tenth aspect, the resource pool configuration information further indicates N sending resource pools and P receiving resource pools, N is an integer greater than or equal to 1, P is an integer greater than or equal to 1, and P is greater than or equal to N.

According to an eleventh aspect, a terminal apparatus is provided. The terminal apparatus may be the data transmission apparatus in the foregoing methods, or may be a chip disposed in the data transmission apparatus. The terminal apparatus includes a processor, coupled to a memory, and configured to execute instructions in the memory, to implement the method performed by the data transmission apparatus in any one of the possible implementations of the first aspect, or the method performed by the data transmission apparatus in the third aspect to the eighth aspect. Optionally, the terminal apparatus further includes a memory. Optionally, the terminal apparatus further includes a communication interface, and the processor is coupled to the communication interface.

When the terminal apparatus is a data transmission apparatus, the communication interface may be a transceiver or an input/output interface.

When the terminal apparatus is a chip disposed in the data transmission apparatus, the communication interface may be an input/output interface.

Optionally, the transceiver may be a transceiver circuit. Optionally, the input/output interface may be an input/output circuit.

According to a twelfth aspect, the embodiments may provide a network apparatus. The network apparatus may be the configuration apparatus for resource pool configuration information in the foregoing methods, or a chip disposed in the configuration apparatus for resource pool configuration information. The network apparatus includes a processor, coupled to a memory, and configured to execute instructions in the memory, to implement the method performed by the configuration apparatus for resource pool configuration information in any of the possible implementations of the second aspect. Optionally, the network apparatus further includes a memory. Optionally, the network apparatus further includes a communication interface, and the processor is coupled to the communication interface.

When the network apparatus is configured as a configuration apparatus for resource pool configuration information, the communication interface may be a transceiver or an input/output interface.

When the network apparatus is a chip disposed in a configuration apparatus for resource pool configuration information, the communication interface may be an input/output interface.

Optionally, the transceiver may be a transceiver circuit. Optionally, the input/output interface may be an input/output circuit.

According to a thirteenth aspect, the embodiments may provide a program. When being executed by a processor, the program is configured to perform any method in the possible implementations of the first aspect, perform any method in the third aspect to the eighth aspect, or perform any method in the possible implementations of the second aspect.

According to a fourteenth aspect, the embodiments may provide a computer program product (or referred to as a computer program) storing one or more computers. When the computer program product is executed by a processor, the processor performs the method in any one of the possible implementations of the first aspect, the method in any one of the third aspect to the eighth aspect, or the method in any one of the possible implementations of the second aspect.

According to a fifteenth aspect, the embodiments may provide another computer program product (or referred to as a computer program) storing one or more computers. When the computer program product is executed by a processor, the processor performs the method in the second aspect or any one of the possible implementations of the second aspect.

According to a sixteenth aspect, the embodiments may provide a chip. The chip includes at least one processor, configured to support a terminal apparatus in implementing the function in any one of the possible implementations of the first aspect or implementing the function in any one of the third aspect to the eighth aspect, or configured to support a network apparatus in implementing the function in any one of the possible implementations of the second aspect. The chip system may further include a memory. The at least one processor is communicatively connected to the at least one memory, and the at least one memory stores instructions, used to store program instructions and data that are necessary for the terminal apparatus and the network apparatus. Optionally, the chip system further includes an interface circuit, and the interface circuit provides the program instructions and/or the data for the at least one processor.

According to a seventeenth aspect, the embodiments may provide a non-transitory computer-readable storage medium, where the non-transitory computer-readable storage medium stores a program, and the program enables a terminal apparatus to perform any method in the possible implementations of the first aspect, perform any method in the third aspect to the eighth aspect, or perform any method in the possible implementation of the second aspect.

According to an eighteenth aspect, the embodiments may provide a communication system, including a network apparatus and a terminal apparatus, where the terminal apparatus performs the method in any one of the possible implementations of the first aspect, or performs the method in any one of the third aspect to the eighth aspect, and the network apparatus performs the method in any one of the possible implementations of the second aspect.

It should be noted that, for understanding of the beneficial effects brought by the implementations in the ninth aspect to the eighteenth aspect, refer to the implementations in the first aspect to the eighth aspect, and therefore details are not described again.

According to the embodiments, the resource pool configuration information including the first resource pool information and the second resource pool information may be obtained, and the first priority value corresponding to the PSSCH may be obtained. Because a smaller priority value indicates a higher priority, when the first priority value is less than the first priority threshold, for a high-priority PSSCH, it may be determined to determine, in the partial-sensing-selection-based resource determination mechanism and/or the random-selection-based resource determination mechanism in the first resource pool, a resource for sending the PSSCH. A probability of a collision between the high-priority PSSCH and a low-priority PSSCH can be reduced, thereby ensuring QoS of the high-priority PSSCH and improving the QoS of the high-priority PSSCH.

DETAILED DESCRIPTION OF THE EMBODIMENTS

The following further describes the embodiments with reference to the accompanying drawings. It should be understood that system architectures and service scenarios in the embodiments may be intended to describe possible implementations and should not be construed as a unique limitation. Persons of ordinary skill in the art may understand that the embodiments are also applicable to a similar problem as a system structure evolves and a new service scenario emerges.

In the embodiments and the accompanying drawings, terms "first", "second", "third", "fourth", and the like (if existent) are intended to distinguish between similar objects but do not necessarily indicate an order or sequence. It should be understood that the data used in such a way are interchangeable in appropriate circumstances, so that embodiments described herein can be implemented in an order other than the content illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

To better understand a data transmission method and apparatus, and a device in the embodiments, a system architecture of a communication system used in the embodiments is first described. The embodiments may be applied to a system in which terminal apparatuses such as D2D and V2X terminal apparatuses directly communicate with each other, and in the communication system, a plurality of terminal apparatuses may be allowed to perform direct discovery and direct communication when there is a network infrastructure or there is no network infrastructure. Therefore, the method in the embodiments is applicable to communication scenarios with network coverage and without network coverage.

Figure 1:
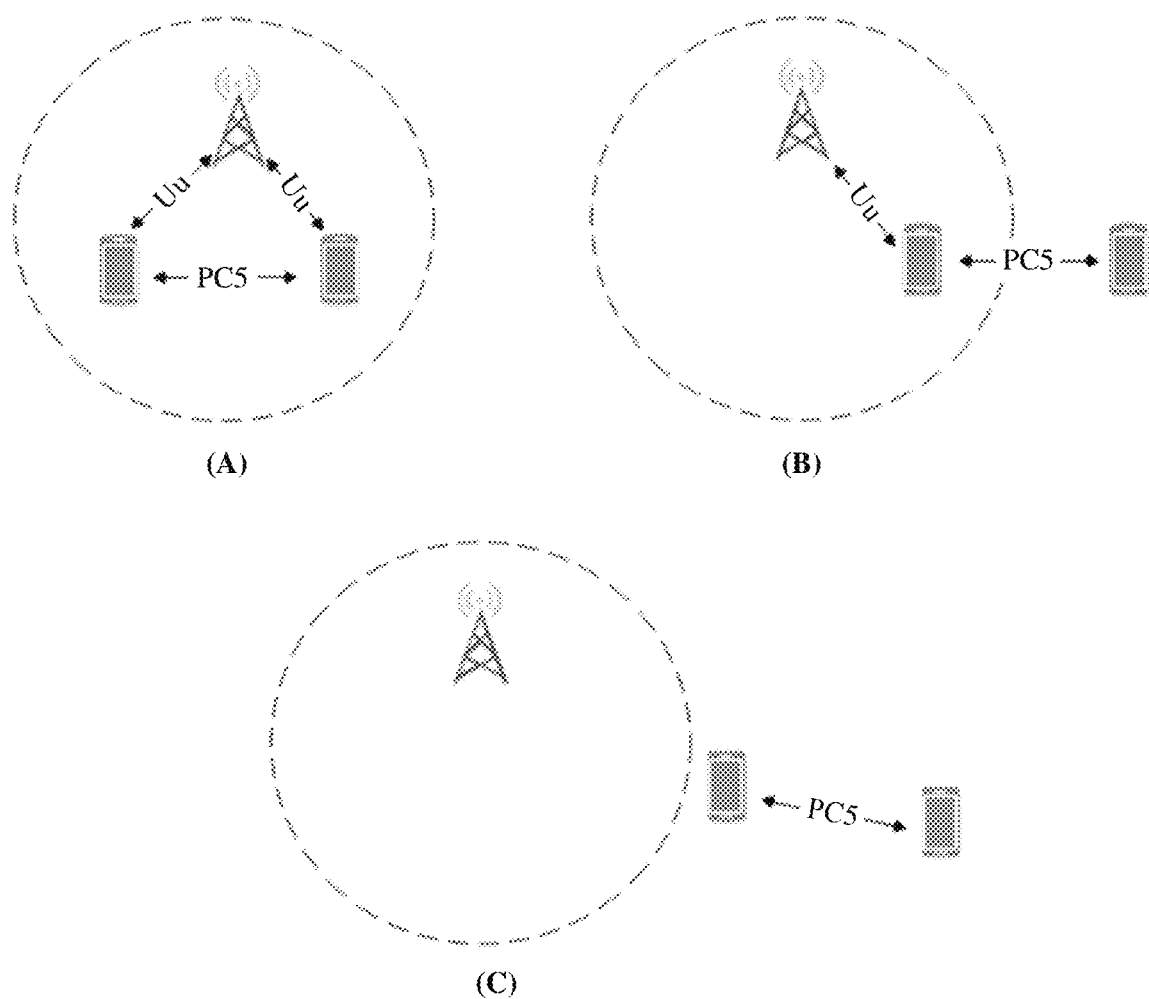
FIG. 1 is a schematic diagram of a system framework according to an embodiment.

FIG. 1 is a schematic diagram of a system framework according to an embodiment. As shown in a figure (A) in FIG. 1, all terminal apparatuses are in a communication scenario with network coverage. The terminal apparatuses directly communicate with each other, and the terminal apparatuses communicate with a network apparatus by using evolved universal terrestrial radio access network (UTRAN)-to-user-equipment. In addition, as shown in a figure (B) in FIG. 1, terminal apparatuses are not all in a communication scenario with network coverage, the terminal apparatuses communicate with each other by using PCS, and a terminal apparatus in network coverage communicates with a network apparatus by using UTRAN-to-user-equipment (Uu). Furthermore, as shown in a figure (C) in FIG. 1, terminal apparatuses are all in a communication scenario without network coverage, and the terminal apparatuses communicate with each other by using PCS.

Further, an application scenario of the Internet of Vehicles is proposed. However, due to consideration of security, a delay requirement in this scenario is very high. Therefore, in a network of an LTE technology proposed by 3GPP, an Internet of Vehicles technology of V2X is proposed. V2X communication refers to communication between a vehicle and anything outside.

Figure 2:
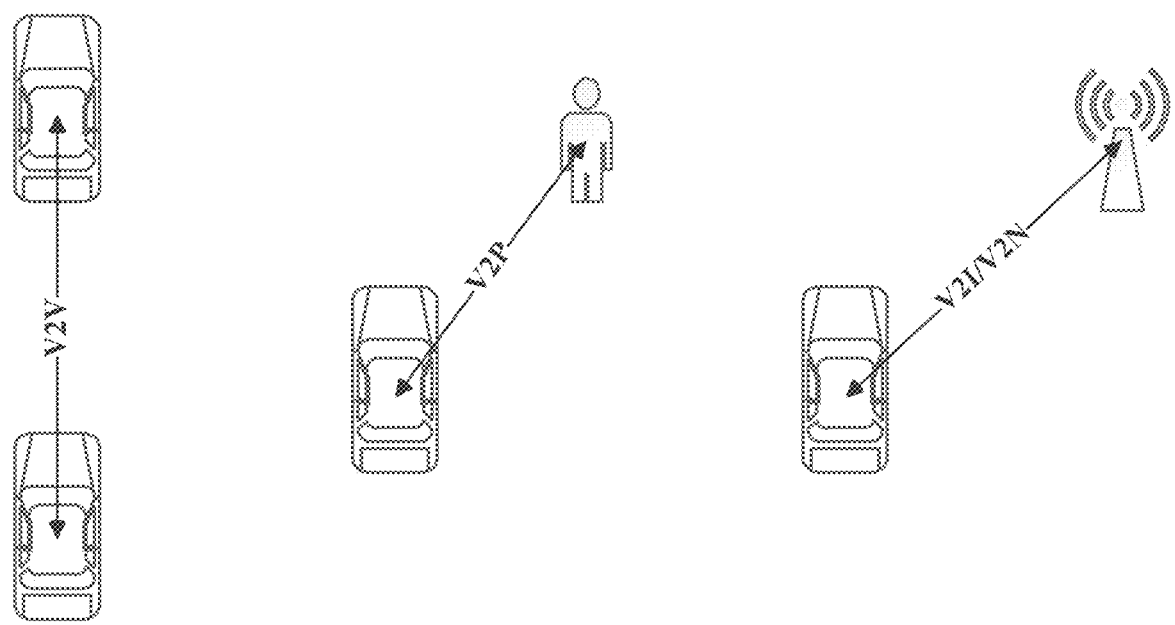
FIG. 2 is a schematic diagram of V2X communication according to an embodiment.

FIG. 2 is a schematic diagram of V2X communication according to an embodiment. As shown in the figure, the V2X communication includes, but is not limited to, vehicle to vehicle (V2V) communication, vehicle to pedestrian (V2P) communication, and vehicle to network (V2N) communication. The V2X communication may further include vehicle to infrastructure (V2I) communication and the like, and the V2X communication is not exhaustively listed herein. In addition, the V2X communication is intended for a high-speed device represented by a vehicle, and may be applied to scenarios such as an intelligent vehicle, self-driving, and an intelligent transportation system. Because the V2X communication may support a communication scenario with network coverage and a communication scenario without network coverage, a network access device scheduling mode, for example, an evolved universal terrestrial radio access network nodeB (eNB) scheduling mode and a UE self-selection mode may be used as a resource allocation manner of the V2X communication. Based on the V2X technology, a vehicle user (V-UE) may periodically send some information of the V-UE, such as a location, a speed, and intent (for example, turning, paralleling, and reversing), and some aperiodic event triggered information to a surrounding V-UE, and similarly, the V-UE also receives information about a surrounding user in real time.

In addition, considering air interface transmission of an evolved universal terrestrial radio access network-to-user equipment (Uu), two parties of wireless communication may include a network apparatus and a terminal apparatus. In addition, considering sidelink (SL) air interface transmission, both a receive end and a transmit end of wireless communication are terminal apparatuses. Therefore, the network apparatus may be a conventional macro evolved nodeB (eNB) in an LTE wireless communication system and a conventional universal mobile telecommunication system (UMTS), may be a micro evolved nodeB eNB in a heterogeneous network (HetNet) scenario, may be a base band unit (BBU) and a remote radio unit (RRU) in a distributed base station scenario, may be a baseband pool and a radio unit in a cloud radio access network (CRAN) scenario, or may be a next generation nodeB (gNB) in a future wireless communication system, for example, a 5th generation mobile networks (5G) new radio (NR) system. The terminal apparatus may be an in-vehicle communication module or another embedded communication module, or may be a handheld communication device of a user, including a mobile phone, a tablet computer, and the like. This is not limited herein.

In addition, some terms or concepts in the embodiments are explained, to help persons skilled in the art have a better understanding.

1. Full-Sensing-Based Resource Determination Mechanism.

A manner of selecting a resource for data transmission based on sensing may be classified into full sensing and partial sensing selection based on a quantity of sensing time units. The full sensing is sensing in all time units included in a sensing window $[n-T_0, n-T_{prco, 0}]$. It should be understood that a time unit used for sending may not be used for sensing.

Determining a resource based on sensing may include the following process.

First, a first terminal apparatus generates a to-be-sent PSSCH at a moment of a slot n, and a UE receives, in a resource pool in the sensing window $[n-T_0, n-T_{prco, 0}]$, a PSCCH from a second terminal apparatus, or a PSCCH and a PSSCH from the second terminal apparatus. The SCI may be detected and decoded on the PSCCH. One piece of SCI may schedule at least one transmission. For example, one piece of SCI schedules three transmissions. In the three transmissions, the first transmission is initial transmission of data carried on one PSSCH, and the last two transmissions are retransmission of the data carried on the PSSCH. In other words, each of the three transmissions is retransmission of one piece of data. Sensing information included in the SCI includes time-frequency resource information for the second data retransmission and the third data retransmission, periodic time-frequency resource information reflecting a data service period, data priority information (priority of PSSCH), and the like. It may be understood that, at a given moment, the first terminal apparatus sends one piece of SCI to reserve a time-frequency resource after the moment for new transmission or retransmission of a piece of data, and then the second terminal apparatus learns of a time-frequency resource reservation state of the user by decoding the SCI, thereby avoiding selecting the reserved time-frequency resource to reduce a resource collision. The first terminal apparatus and the second terminal apparatus are different terminal apparatuses, and the second terminal apparatus may be at least one terminal apparatus different from the first terminal apparatus.

Further, if the first terminal apparatus learns, from sensing information of SCI of the second terminal apparatus, that a time-frequency resource reserved by the second terminal apparatus is in a resource selection window $[n+T_1, n+T_2]$ of the first terminal apparatus, the first terminal apparatus may measure, based on the sensing information, a demodulation reference signal (DMRS) of data or a control channel that the second terminal apparatus needs to send on the time-frequency resource, to obtain a reference signal received power (RSRP), where $T_1$ indicates, and $T_2$ indicates. If the RSRP is greater than a threshold $Th_{RSRP}$, the UE excludes the time-frequency resource from the resource selection window. After excluding the unavailable time-frequency resource in the resource selection window, the UE may determine that a remaining time-frequency resource in the resource selection window is an available time-frequency resource, so as to select a time-frequency resource from the available time-frequency resource to send data. The threshold may be preset, configured by an access network device, or preconfigured.

Finally, after excluding the unavailable time-frequency resource in the resource selection window, the first terminal apparatus may determine that a remaining time-frequency resource in the resource selection window is an available time-frequency resource, so as to select a time-frequency resource from the available time-frequency resource to send data.

It can be understood that the time-frequency resource used when the first terminal apparatus sends the data is selected by the first terminal apparatus based on a sensing result (that is, the determined available resource) in the sensing window $[n-T_0, n-T_{prco, 0}]$.

In this embodiment, the sensing result is a result determined through the foregoing steps, $T_0$ and $T_{prco, 0}$ are used to determine a size of the sensing window, $T_0$ and $T_{prco, 0}$ are time domain values that are greater than or equal to 0 and use a time unit as a unit. For example, a value of $T_0$ may be a quantity of slots determined by a subcarrier spacing (SCS) corresponding to 1100 ms, or a quantity of slots determined by an SCS corresponding to 100 ms. A value of $T_{prco, 0}$ may be a positive integer, for example, 1, 2, 3, or 4, according to different SCSs. A value of $T_{prco, 0}$ may be determined according to a capability of hardware of a user terminal to process the sensing result. In addition, $T_1$ and $T_2$ are used to determine a size of the selection window, $T_1$ and $T_2$ are time domain values that are greater than or equal to 0 and that use a time unit as a unit, and values of $T_1$ and $T_2$ may be related to a delay processing capability of the terminal apparatus and a QoS requirement of the to-be-sent data.

2. Partial-Sensing-Selection-Based Resource Determination Mechanism.

The partial-sensing-selection-based resource determination mechanism is a manner of selecting a resource for data transmission based on partial-sensing selection (partial-sensing). It should be understood that partial-sensing selection is to perform sensing in several time units within a period of time (for example, within 1100 ms, within 100 ms, or within a period of time equal to a sensing window for full sensing). Other steps are similar to those of the foregoing full sensing manner, and details are not described herein again.

If a sensing manner is not described, the described sensing-based resource determination mechanism may be represented as a full-sensing-based resource determination mechanism, or it may be understood that the full-sensing-based resource determination mechanism and the sensing-based resource determination mechanism replace each other. However, regardless of full sensing or partial-sensing selection, a resource is selected from a resource selection window based on a sensing result to send the PSSCH.

3. Random-Selection-Based Resource Determination Mechanism.

The random-selection-based resource determination mechanism is that a resource does not need to be determined based on sensing, and a resource is directly randomly selected from a resource selection window to send a resource in the PSSCH.

It may be understood that each of a high-priority terminal apparatus, a high-priority PSSCH, and high-priority data described in this embodiment refers to a priority of the PSSCH sent or received by the terminal apparatus in a time unit. The priority may be indicated in SCI corresponding to scheduling the PSSCH, that is, a high priority indicates a high priority of the PSSCH, and a higher priority indicates a higher QoS requirement of data carried on the PSSCH. In this embodiment, a priority value is used to represent a priority. Based on a definition, a higher priority corresponds to a lower priority value, and a lower priority corresponds to a higher priority value. In actual application, alternatively, a higher priority may correspond to a higher priority value, and a lower priority may correspond to a lower priority value. The example in this embodiment is merely used to understand this solution and should not be understood as a limitation.

Because the terminal apparatus that performs random selection does not exclude a resource based on a sensing result, a probability that the randomly selected resource collides with a resource selected by another user may increase. To reduce the probability of a resource collision, two different types of resource pools may be separately configured, and time-frequency resources in the resource pools do not completely overlap. Therefore, interference between UEs that perform different resource selection can be reduced, that is, a UE that selects a resource based on sensing and a UE that randomly selects a resource perform resource selection in different resource pools. Because QoS of each piece of data is different, a priority of a PSSCH in each transmission is also different, and resource selection is performed in different resource pools. In a transmission manner of randomly selecting a resource, a probability that a high-priority PSSCH encounters a collision is similar to a probability that a low-priority PSSCH encounters a collision. Therefore, when resource selection is performed at the same time, a high-priority PSSCH may collide with a low-priority PSSCH. Therefore, a QoS requirement of the high-priority PSSCH cannot be ensured, and in this way, QoS of the high-priority PSSCH is reduced.

To resolve the foregoing problem, an embodiment may provide a data transmission method, to reduce a probability of a collision between a high-priority PSSCH and a low-priority PSSCH. In this way, QoS of the high-priority PSSCH can be ensured and the QoS of the high-priority PSSCH can be improved.

Figure 3:
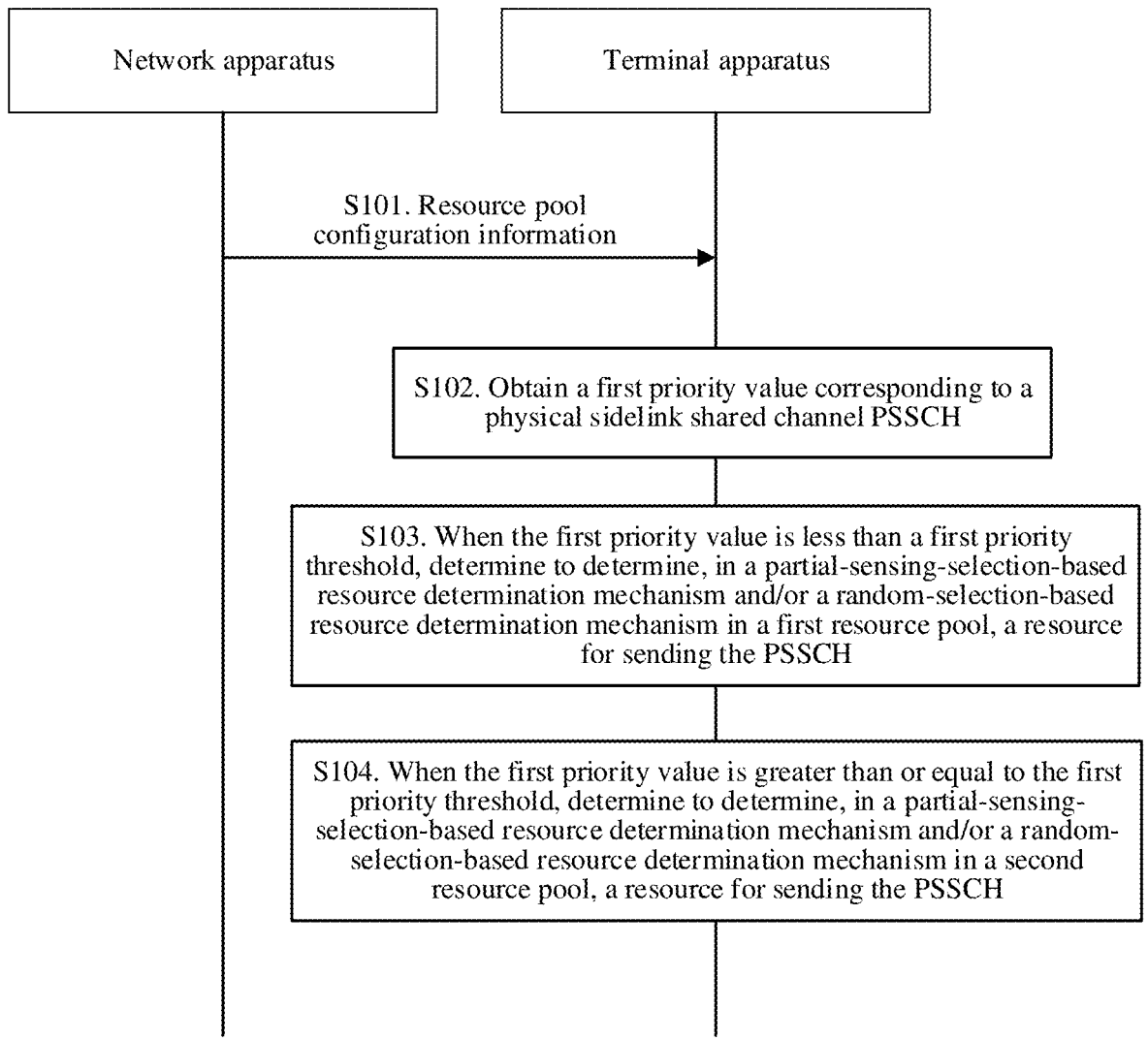
FIG. 3 is a schematic diagram of an embodiment of a data transmission method according to an embodiment.

The following describes in detail a data transmission method used in an embodiment by using a first terminal apparatus as an execution body. FIG. 3 is a schematic diagram of an embodiment of a data transmission method according to an embodiment. The data transmission method includes the following steps.

S101. A terminal apparatus obtains resource pool configuration information.

In this embodiment, the resource pool configuration information needs to be obtained first. The resource pool configuration information is obtained by the first terminal apparatus and may be resource pool configuration information sent by a network apparatus and received by the first terminal apparatus. Alternatively, the resource pool configuration information may be obtained based on configuration of a sidelink bandwidth part (SL-BWP). The resource pool configuration information includes first resource pool information and second resource pool information, the first resource pool information indicates a first resource pool, the second resource pool information indicates a second resource pool, the first resource pool and the second resource pool are different types of resource pools, the first resource pool is a set of first time-frequency resources, the second resource pool is a set of second time-frequency resources, and a resource determination mechanism of the first resource pool includes full sensing, a resource determination mechanism of the second resource pool includes at least one of partial-sensing selection and random selection. It should be understood that, in actual application, the resource determination mechanism of the first resource pool may further include partial-sensing selection and/or random selection, and the second resource pool can be used only for partial-sensing selection and/or random selection. This is not limited herein.

In a network coverage area, the first terminal apparatus may obtain the resource pool configuration information by using a system information block (SIB) based on a receiving network apparatus, obtain the resource pool configuration information by using cell-specific radio resource control (RRC) signaling based on a receiving network apparatus, or obtain the resource pool configuration information by using UE-specific RRC signaling based on a receiving network apparatus. When there is no network coverage area, the first terminal apparatus may use configuration information of a sidelink (SL) resource pool preconfigured by a device before delivery as the resource pool configuration information. The resource pool configuration information may be configuration information of an SL resource pool.

Further, the resource pool configuration information is further used for sidelink communication between terminal apparatuses, and includes a plurality of channels sent and received by the terminal apparatuses, for example, a physical channel used for sidelink communication, including but not limited to at least one of a physical sidelink control channel (PSCCH), a PSSCH, a physical sidelink discovery channel (PSDCH), a physical sidelink broadcast channel (PSBCH), and a physical sidelink feedback channel (PSFCH). A service type carried by the PSSCH may include any one of a unicast communication type, a multicast communication type, or a broadcast communication type.

For example, in time domain, the SL resource pool may include one or more time units. The time unit may include, but is not limited to, one symbol, several symbols, one slot, one subframe, one frame, and the like. The one or more time units may be consecutive in time or may be discrete in time. In addition, in frequency domain, the SL resource pool may include one or more frequency domain units. The frequency domain unit may include, but is not limited to, one resource element (RE), several REs, one resource block (RB), several RBs, one subchannel, several subchannels, and the like. One subchannel includes one or more consecutive RBs or non-consecutive RBs in frequency domain. For ease of understanding, in this embodiment, the time unit is described by using a slot, and the time-frequency domain unit is described by using a subchannel. It may be understood that in actual application, the time unit may further include, but is not limited to, a symbol, a subframe, and the like described in the foregoing embodiment, and the time-frequency domain unit may further include, but is not limited to, a resource block, a resource element, and the like described in the foregoing embodiment. A time unit and a time-frequency domain unit may need to be flexibly determined based on an actual requirement and an application. This is not limited herein.

Optionally, the resource pool configuration information obtained by the first terminal apparatus may further indicate N sending resource pools (TxPool) and P receiving resource pools (RxPool). Because the sending resource pools are used to send SLs, and the receiving resource pools are used to receive SLs, a total quantity of configured receiving resource pools is greater than or equal to a total quantity of configured sending resource pools, that is, P is greater than or equal to N. Therefore, it can be ensured that the first terminal apparatus can receive, as much as possible, data sent from different sending resource pools. For example, the sending resource pools may include, but is not limited to, a sending resource pool (TxPoolScheduling) used to perform sidelink communication according to network scheduling, a sending resource pool (TxPoolSelectedNormal) used to perform sidelink communication according to autonomous resource selection, and a sending resource pool (TxPoolSelectedPS-Normal) used to perform sidelink communication according to autonomous resource selection based on power saving (PS). TxPoolSelectedNormal belongs to the first resource pool, and TxPoolSelectedPSNormal belongs to the second resource pool.

S102. The terminal apparatus obtains a first priority value corresponding to a physical sidelink shared channel PSSCH.

In this embodiment, the first priority value is obtained, where the first priority value is a priority corresponding to the PSSCH and may be indicated in corresponding SCI, and the first priority value is obtained by the first terminal apparatus. In actual application, the first priority value may be a priority corresponding to data carried on the PSSCH, or the first priority value may be a priority corresponding to a data service carried on the PSSCH.

The first terminal apparatus may generate the to-be-sent PSSCH at a moment of a slot n. It can be understood from the foregoing embodiment that priority information corresponding to the PSSCH may be obtained, and the priority information is the first priority value. Then, the first terminal obtains a first priority threshold.

Optionally, the first priority threshold may be provided by the resource pool configuration information, provided by the first resource pool information, predefined, or preconfigured. When the first resource pool information further indicates preemption information, the first priority threshold may alternatively be provided by the preemption information, that is, the first priority threshold is equal to a priority threshold for allowing preemption. A manner of determining the first priority threshold should not be construed as a limitation on the solution.

For example, a value range of the first priority may be any integer value from 1 to 8. The value of the first priority threshold may also be any integer value from 1 to 8, that is, may be 1, 2, 3, 4, 5, 6, 7, or 8. It should be understood that, in actual application, the value of the first priority threshold may be any integer value from 1 to 9, that is, may be 1, 2, 3, 4, 5, 6, 7, 8, or 9. It may be understood that, in actual application, when the value is 9, it indicates that regardless of what the first priority value is, that the first priority value is less than the first priority threshold is met. Alternatively, the value of the first priority threshold may be any integer value from 1 to 16, that is, may be any integer value from 1 to 16. The first priority threshold may need to be flexibly determined based on an actual situation. This is not limited herein. It should be understood that the foregoing examples are merely used to understand this solution, and a processing manner may be flexibly performed based on an actual situation.

Further, because a smaller priority value indicates a higher corresponding priority, that is, a higher corresponding QoS requirement, whether the PSSCH has a high priority is determined, that is, whether the first priority value corresponding to the PSSCH is less than the first priority threshold needs to be determined. When the first priority value is less than the first priority threshold, step 103 is performed; or when the first priority value is greater than or equal to the first priority threshold, step 104 is performed.

S103. When the first priority value is less than a first priority threshold, the terminal apparatus determines to determine, in the partial-sensing-selection-based resource determination mechanism and/or the random-selection-based resource determination mechanism in the first resource pool, a resource for sending the PSSCH.

In this embodiment, when the first priority value corresponding to the to-be-sent PSSCH is less than the first priority threshold, the first terminal apparatus determines to send the PSSCH in the first resource pool. The first resource pool may be a set of first time-frequency resources, and the first resource pool may be originally a full-sensing-based resource determination mechanism; but when the first priority value corresponding to the PSSCH is less than the first priority threshold, the full-sensing-based resource determination mechanism is not used, and a partial-sensing-based resource determination mechanism or a random-selection-based resource determination mechanism is used instead. Therefore, the first terminal apparatus may determine, in the partial-sensing-selection-based manner and/or the random-selection-based manner in the first resource pool, a first time-frequency resource for sending the PSSCH.

Optionally, when it is determined that a bandwidth of a frequency domain resource for initial transmission for sending the PSSCH in the first resource pool is one subchannel, further, the first terminal apparatus reserves by using SCI that a bandwidth of a frequency domain resource for retransmission after the initial transmission is one or more subchannels. The SCI may carry information about a quantity of subchannels occupied by the PSCCH, that is, a quantity of subchannels required for subsequently retransmitting the PSSCH. Because a fixed minimum frequency domain scheduling unit, that is, one subchannel, is used for random sending in initial transmission, a collision probability of initial transmission in frequency domain can be reduced. A frequency domain resource for retransmission indicated by using SCI is not limited by a quantity of subchannels, and an appropriate quantity of subchannels may be occupied based on an actual data size, including more than one subchannel. Another terminal apparatus (other than the first terminal apparatus) may obtain frequency domain indication information of the SCI through full sensing or partial sensing, to avoid a collision in resource selection, thereby improving transmission reliability.

For example, because the first priority threshold may be determined in different manners, in this embodiment, an example in which the first priority threshold is provided by the resource pool configuration information, the first resource pool is TxPoolSelectedNormal, and the second resource pool is TxPoolSelectedPSNormal is used for description. The random-selection-based resource determination mechanism is used as an example. When the first priority value corresponding to the to-be-sent PSSCH is less than the first priority threshold, it indicates that the first terminal apparatus may randomly select, from resources that are in a resource selection window $[n+T_1, n+T_2]$ and that belong to a TxPoolSelectedNormal resource pool, one first time-frequency resource to send the PSSCH. At the moment of the slot n, a physical layer processing module of the first terminal apparatus is configured to report, to a MAC layer processing module of the first terminal apparatus, all time-frequency candidate resources belonging to the TxPoolSelectedNormal resource pool in a slot of the resource selection window $[n+T_1, n+T_2]$, so that the MAC layer processing module randomly selects one candidate resource, that is, a first resource, for sending the PSSCH, where one candidate element includes at least one subchannel resource in one slot for sending the PSSCH. When the first resource for sending the PSSCH is determined in the partial-sensing-selection-based manner, one first time-frequency resource is selected to send the PSSCH by sensing a resource that belongs to the TxPoolSelectedNormal resource pool in a slot of the resource selection window $[n+T_1, n+T_2]$ in several slots.

Value ranges of $T_1$ and $T_2$ in the resource selection window may be as follows:

$0 \leqslant T_1 \leqslant T_{proc, 1}$;

$T_{2\ min} \leqslant T_2 \leqslant$ packet delay budget; and $T_1 < T_2$.

$T_{proc, 1}$ indicates a user processing delay, a minimum value of $T_{proc, 1}$ may be 0, and $T_{2\ min}$ may be configured by the network apparatus, preconfigured, or autonomously selected by a user equipment. A packet delay budget (PDB) indicates a maximum delay time required from generation of a packet at a service layer to successful sending of the packet. In addition, the PDB may be a value that measures the delay of the to-be-sent data in a unit of a slot, a subframe, a frame, or the like, or may be a value that measures the delay of the to-be-sent data in a unit of a millisecond (ms), a second (s), or the like. This is not limited herein.

It may be understood that, in the slot n, a remaining PDB is a remaining delay time from generation of the packet at the service layer to the slot n. For example, in the slot n, if a remaining PDB is 20 ms, and one slot is 0.5 ms, in a slot n+1, a remaining PDB is 19.5 ms, in a slot n+2, a remaining PDB is 19 ms, in a slot n+3, a remaining PDB is 18.5 ms, and so on. Details are not described again. It should be understood that the foregoing examples are merely used to understand this solution, and a data sending manner should be flexibly performed based on an actual situation.

Optionally, if an example in which the first priority threshold is predefined is used, a value of the first priority threshold may be 2 or any integer value from 1 to 9. A smaller priority value indicates a higher priority level. If the value of the first priority threshold is 2, it indicates that only a PSCCH with a highest priority (that is, a priority value is 1) can send the PSSCH in a manner of resource partial-sensing selection or random selection in the TxPoolSelectedNormal resource pool, so as to reduce interference between random selection or partial-sensing selection and a sensing-based selection manner.

S104. When the first priority value is greater than or equal to the first priority threshold, the terminal apparatus determines to determine, in the partial-sensing-selection-based resource determination mechanism and/or the random-selection-based resource determination mechanism in the second resource pool, a resource for sending the PSSCH.

In this embodiment, when the first priority value corresponding to the to-be-sent PSSCH is greater than or equal to the first priority threshold, the first terminal apparatus determines to send the PSSCH in the second resource pool. Because the second resource pool is a set of second time-frequency resources, a second terminal apparatus may determine, in a manner of partial-sensing selection and/or random selection in the second resource pool, a second time-frequency resource for sending the PSSCH.

For example, in this embodiment, an example in which the first priority threshold is provided by the resource pool configuration information, the first resource pool is TxPool-SelectedNormal, and the second resource pool is TxPool-SelectedPSNormal is used for description. When the first priority value corresponding to the to-be-sent PSSCH is greater than or equal to the first priority threshold, it indicates that the first terminal apparatus may randomly select, from resources that are in a resource selection window $[n+T_1, n+T_2]$ and that belong to a TxPoolSelectedPSNormal resource pool, a second time-frequency resource to send the PSSCH, or may select, through partial sensing, a second time-frequency resource to send the PSSCH. A manner of selecting a resource through partial sensing is described in the foregoing embodiment, and details are not described herein again.

Optionally, if an example in which the first priority threshold is predefined is used, a value of the first priority threshold may be 2 or any integer value from 1 to 9. A smaller priority value indicates a higher priority level. If the value of the first priority threshold is 2, it indicates that only a PSCCH with a highest priority (that is, a priority value is 1) can send the PSSCH in a manner of resource partial-sensing selection or random selection in the TxPoolSelectedNormal resource pool, so as to reduce interference between random selection or partial-sensing selection and a sensing-based selection manner.

It should be understood that there is no time sequence relationship between or time sequence limitation on step 103 and step 104, that is, step 103 and step 104 are steps performed when different conditions are met.

It can be understood from the foregoing embodiment that a high-priority PSSCH (that is, a PSSCH less than the first priority threshold) may select, in the partial-sensing-selection-based and/or random-selection-based resource determination mechanism, a resource from a resource pool for full-sensing selection to send the PSSCH, which is equivalent to allowing coexistence of different resource selection manners of full-sensing selection, partial-sensing selection, and/or random selection in the resource pool. For a low-priority PSSCH (that is, a PSSCH greater than or equal to the first priority threshold), a resource is selected, in the partial-sensing-selection-based and/or random-selection-based resource determination mechanism, from a resource pool in which only partial-sensing selection and/or random selection can be performed, to send the PSSCH.

It should be noted that the first resource pool information further indicates random selection configuration information or partial-sensing selection configuration information. The first terminal apparatus may determine, in the random-selection-based resource determination mechanism in the first resource pool, the first time-frequency resource for sending the PSSCH, or may determine, in the partial-sensing-selection-based resource determination mechanism in the first resource pool, the first time-frequency resource for sending the PSSCH. The following separately describes the two manners.

1. Determine to Send the PSSCH in a Random Selection Manner in the First Resource Pool.

Figure 4:
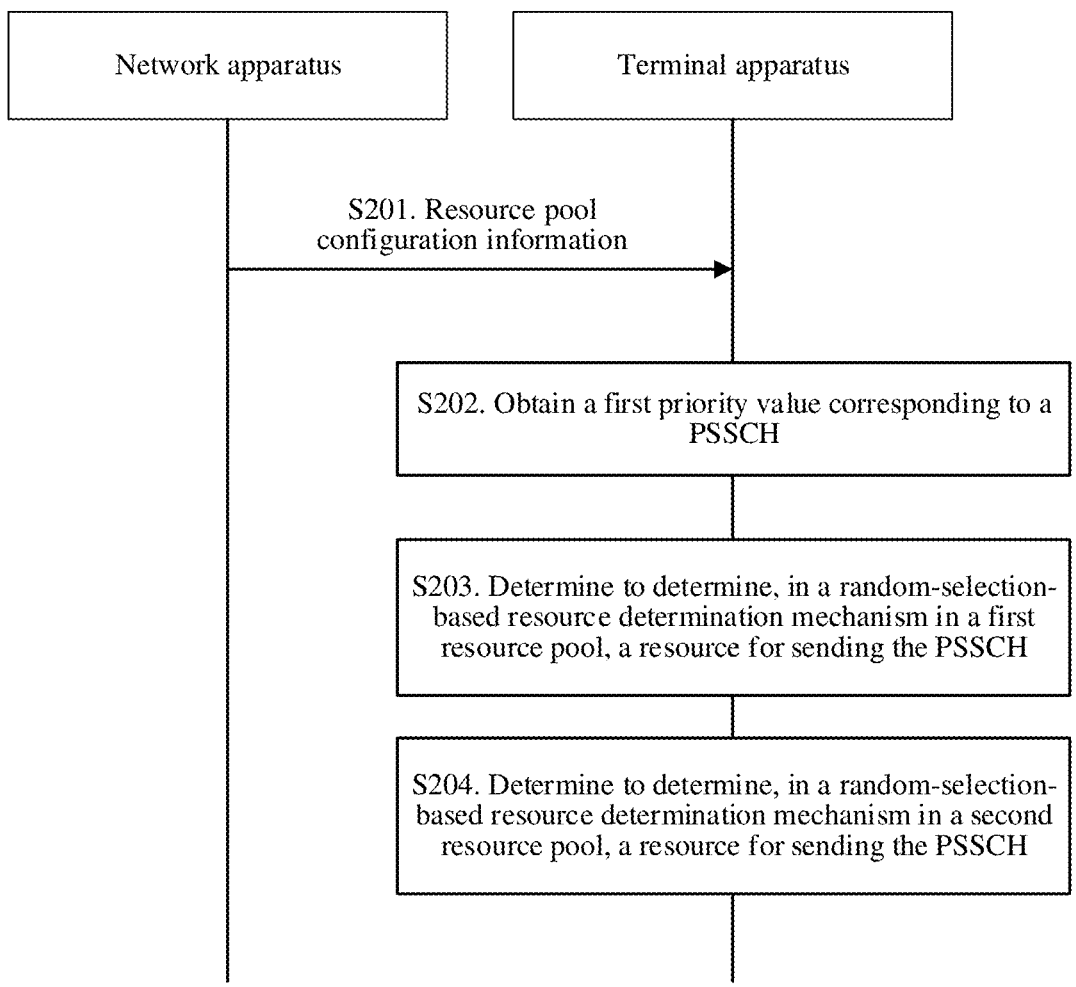
FIG. 4 is a schematic diagram of another embodiment of a data transmission method according to an embodiment.

In this embodiment, the first terminal apparatus may determine to send the PSSCH in the random selection manner in the first resource pool. For ease of understanding, FIG. 4 is a schematic diagram of another embodiment of a data transmission method according to an embodiment. As shown in the figure, in this example, the data transmission method includes the following steps.

S201. A terminal apparatus obtains resource pool configuration information.

In this embodiment, the resource pool configuration information needs to be obtained first. The resource pool configuration information is obtained by the first terminal apparatus and may be resource pool configuration information sent by a network apparatus and received by the first terminal apparatus. The resource pool configuration information may be similar to that described in step S101 in the foregoing embodiment and details are not described herein again.

Further, the first resource pool information included in the resource pool configuration information further indicates random selection configuration information, and the random selection configuration information includes: enabling the random-selection-based resource determination mechanism or disabling the random-selection-based resource determination mechanism.

S202. The terminal apparatus obtains a first priority value corresponding to a PSSCH.

In this embodiment, the first priority value is obtained, where the first priority value is a priority corresponding to the PSSCH, the first priority may be indicated in corresponding SCI, and the first priority value is obtained by the first terminal apparatus. In actual application, the first priority value may be a priority corresponding to data carried on the PSSCH, or the first priority value may be a priority corresponding to a data service carried on the PSSCH. The first priority value may be similar to that described in step S102 in the foregoing embodiment, and details are not described herein again.

S203. The terminal apparatus determines to determine, in a random-selection-based resource determination mechanism in a first resource pool, a resource for sending the PSSCH.

In this embodiment, because the first resource pool information further indicates the random selection configuration information, when the random selection configuration information indicated by the first resource pool information includes the enabling the random-selection-based resource determination mechanism, that is, when the random selection configuration information is configured, it indicates that the first terminal apparatus may determine, in the random-selection-based resource determination mechanism in the first resource pool, a first time-frequency resource for sending the PSSCH. Alternatively, when the random selection configuration information in the first resource pool information is configured to enable the random-selection-based resource determination mechanism, the first terminal apparatus may determine, in the random-selection-based resource determination mechanism in the first resource pool, the first time-frequency resource for sending the PSSCH. Further, when the random selection configuration information is not configured, or the random selection configuration information in the first resource pool information is configured to disable the random-selection-based resource determination mechanism, the first terminal apparatus cannot determine, in the random-selection-based resource determination mechanism in the first resource pool, the first time-frequency resource for sending the PSSCH. It should be understood that a manner of determining, in the random-selection-based resource determination mechanism in the first resource pool, the first time-frequency resource for sending the PSSCH may be similar to that described in step S103 in the foregoing embodiment, and details are not described herein again.

For example, an example in which the first resource pool is TxPoolSelectedNormal is used for description. When the resource pool information corresponding to TxPoolSelectedNormal includes that the random-selection-based resource determination mechanism is enabled, the first terminal apparatus selects the first time-frequency resource from the TxPoolSelectedNormal resource pool in the random-selection-based resource determination mechanism to send the PSSCH. In addition, when the random selection configuration information in the resource pool information corresponding to TxPoolSelectedNormal is configured to enable the random-selection-based resource determination mechanism, the first terminal apparatus may also select the first time-frequency resource from the TxPoolSelectedNormal resource pool in the random-selection-based resource determination mechanism to send the PSSCH. It should be understood that the foregoing example is merely used to understand this solution. A manner of determining, in the random-selection-based resource determination mechanism, a resource for sending the PSSCH may be flexibly performed based on an actual situation and a requirement.

S204. The terminal apparatus determines to determine, in the random-selection-based resource determination mechanism in a second resource pool, a resource for sending the PSSCH.

In this embodiment, because the first resource pool information further indicates random selection configuration information, when the random selection configuration information indicated by the first resource pool information includes that the random-selection-based resource determination mechanism is disabled, that is, when the random selection configuration information in the first resource pool information is not configured, or when the random selection configuration information in the first resource pool information is configured to disable the random-selection-based resource determination mechanism, the first terminal apparatus cannot determine, in the random-selection-based resource determination mechanism in the first resource pool, the first time-frequency resource for sending the PSSCH. In this case, the first terminal apparatus may determine, in the random-selection-based resource determination mechanism in the second resource pool, a second time-frequency resource for sending the PSSCH. It should be understood that a manner of determining, in the random-selection-based resource determination mechanism in the second resource pool, the second time-frequency resource for sending the PSSCH may be similar to that described in step S104 in the foregoing embodiment, and details are not described herein again.

For example, in this embodiment, an example in which the first resource pool is TxPoolSelectedNormal and the second resource pool is TxPoolSelectedPSNormal is used for description. When the random selection configuration information is not configured in the resource pool information corresponding to TxPoolSelectedNormal, or the random selection configuration information is configured to disable the random-selection-based resource determination mechanism, the first terminal apparatus cannot select the first time-frequency resource in the random-selection-based resource determination mechanism from the TxPoolSelectedNormal resource pool to send the PSSCH. In this case, the first terminal apparatus may select the second time-frequency resource in the random-selection-based resource determination mechanism from the TxPoolSelectedNormal resource pool to send the PSSCH. It should be understood that the foregoing example is merely used to understand this solution. A manner of determining, in the random-selection-based resource determination mechanism, a resource for sending the PSSCH may be flexibly performed based on an actual situation and a requirement.

Optionally, the first resource pool information further indicates preemption information, and the preemption information includes enabling a preemption-based resource determination mechanism or disabling a preemption-based resource determination mechanism.

The preemption-based resource determination mechanism is first described. Preemption means that a high-priority PSSCH sent by the first terminal apparatus is allowed to preempt a low-priority PSSCH sent by a second terminal apparatus, where the first terminal apparatus and the second terminal apparatus are different terminal apparatuses. In addition, both the first terminal apparatus and the second terminal apparatus are terminal apparatuses that determine to perform resource selection in the full-sensing-based resource determination mechanism. Therefore, the second terminal apparatus reserves, by sending first SCI at a moment of a slot n, a resource for sending a PSSCH at a moment of a slot n+k, a priority value of the PSSCH is P1, the first terminal apparatus receives the first SCI at the moment of the slot n, and may learn by decoding the first SCI that the priority of the PSSCH reserved by using the first SCI is P1, and reserve the resource for sending the PSSCH at the moment of the slot n+k. A priority value of a PSSCH to be sent by the first terminal apparatus is P2, and P2 is less than P1, that is, the priority of the PSSCH to be sent by the first terminal apparatus is higher than the priority of the PSSCH to be sent by the second terminal apparatus through reservation at the moment of the slot n+k. In this case, the first terminal apparatus sends the second SCI to the second terminal apparatus before the moment of the slot n+k, to notify the second terminal apparatus that the resource reserved at the moment of the slot n+k is preempted by the PSSCH to be sent by the first terminal apparatus. Therefore, after receiving the second SCI, the second terminal apparatus needs to reselect a resource.

Therefore, because the random-selection-based resource determination mechanism is not performed based on sensing, that is, the PSSCH sent by the first terminal apparatus may be sent at any resource location without considering whether another terminal apparatus has a resource reservation, even if a candidate resource is actually reserved by another terminal apparatus, the first terminal apparatus may still choose to send the PSSCH on the candidate resource. Therefore, the first terminal apparatus does not perform sensing, that is, does not decode corresponding SCI. Therefore, the random-selection-based resource determination mechanism is similar to the preemption-based resource determination mechanism, that is, a reserved resource is preempted. In this embodiment, the first resource pool information indicates that the preemption information is associated with the random selection configuration information. Therefore, when the first resource pool information indicates the preemption information, two data transmission manners may be included. In one manner, when the preemption information is enabling a preemption-based resource determination mechanism, and the first priority value is less than the first priority threshold, it may be determined to determine, in the random-selection-based resource determination mechanism in the first resource pool, the resource for sending the PSSCH. In the other manner, when the preemption information is disabling a preemption-based resource determination mechanism, and the first priority value is less than the first priority threshold, it is determined to determine, in the random-selection-based resource determination mechanism in the first resource pool, the resource for sending the PSSCH. The following separately describes the two manners.

(1) When the preemption information is the enabling the preemption-based resource determination mechanism, and the first priority value is less than the first priority threshold, it is determined to determine, in the random-selection-based resource determination mechanism in the first resource pool, the resource for sending the PSSCH.

The preemption information may be enabling the preemption-based resource determination mechanism, that is, a resource for sending the PSSCH may be determined in the random-selection-based resource determination mechanism in the first resource pool. It is determined whether the first priority value is less than the first priority threshold. When the first priority value is less than the first priority threshold, it may be determined to determine, in the random-selection-based resource determination mechanism in the first resource pool, the first time-frequency resource for sending the PSSCH. It should be understood that a manner of determining, in the random-selection-based resource determination mechanism in the first resource pool, the first time-frequency resource for sending the PSSCH may be similar to that described in step S203 in the foregoing embodiment, and details are not described herein again.

For example, in this embodiment, an example in which the first resource pool is TxPoolSelectedNormal is used for description. Therefore, when the preemption information indicated by the TxPoolSelectedNormal resource pool information includes enabling the preemption-based resource determination mechanism, the preemption information indicated by the TxPoolSelectedNormal resource pool further provides a first priority threshold, that is, a first priority value of a PSSCH on which preemption is allowed needs to be less than the first priority threshold. In this case, if a priority of a PSSCH to be sent by the first terminal apparatus that intends to select a resource through random selection is less than the first priority threshold, the first time-frequency resource for sending the PSSCH may be determined in the random-selection-based resource determination mechanism from the TxPoolSelectedNormal resource pool. In other words, the random-selection-based resource determination mechanism coexists with the full-sensing-based resource determination mechanism in the TxPoolSelectedNormal resource pool in a "preemption" manner. It should be understood that the foregoing example is merely used to understand this solution. The first resource pool and the manner of determining, in the random-selection-based resource determination mechanism, a resource for sending the PSSCH may be flexibly determined based on an actual situation and a requirement.

In addition, when the preemption information is enabling the preemption-based resource determination mechanism and the first priority value is greater than or equal to the first priority threshold, or when the preemption information is disabling the preemption-based resource determination mechanism, the first terminal apparatus determines to determine, in the random-selection-based resource determination mechanism in the second resource pool, the second time-frequency resource for sending the PSSCH. A manner in which the first terminal apparatus determines, in the random-selection-based resource determination mechanism in the second resource pool, the second time-frequency resource for sending the PSSCH may be similar to that described in step S204 in the foregoing embodiment, and details are not described herein again.

(2) When the preemption information is the disabling the preemption-based resource determination mechanism, and the first priority value is less than the first priority threshold, it is determined to determine, in the random-selection-based resource determination mechanism in the first resource pool, the resource for sending the PSSCH.

Because the random-selection-based resource determination mechanism may affect the full-sensing-selection-based resource determination mechanism in performance, and preemption may also affect the full-sensing-selection-based resource determination mechanism, allowing both the preemption-based resource determination mechanism and the random-selection-based resource determination mechanism in the foregoing manner increases impact on the full-sensing-based resource determination mechanism, that is, performing in the first resource pool increases a collision probability of the PSSCH. Therefore, in this manner, only when the first resource pool information indicates the disabling the preemption-based resource determination mechanism, and the first priority value is less than the first priority threshold, the first terminal apparatus determines to determine, in the random-selection-based resource determination mechanism in the first resource pool, a corresponding resource for sending a high-priority PSSCH. In any other case, the first terminal apparatus determines to determine, in the random-selection-based resource determination mechanism in the second resource pool, a resource for sending the PSSCH. In this way, interference and conflict impact between random selection, preemption, and full sensing can be reduced, so that a collision of sending a high-priority PSSCH in the random-selection-based resource determination mechanism is reduced, and QoS of the high-priority PSSCH can be ensured.

Therefore, when the preemption information is the disabling the preemption-based resource determination mechanism, and the first priority value is less than the first priority threshold, the first terminal apparatus may determine, in the random-selection-based resource determination mechanism in the first resource pool, the first time-frequency resource for sending the PSSCH. It should be understood that a manner of determining, in the random-selection-based resource determination mechanism in the first resource pool, the first time-frequency resource for sending the PSSCH may be similar to that described in step S203 in the foregoing embodiment, and details are not described herein again.

For example, in this embodiment, an example in which the first resource pool is TxPoolSelectedNormal is used for description. Therefore, when the preemption information indicated by the TxPoolSelectedNormal resource pool information includes the disabling the preemption-based resource determination mechanism, the first terminal apparatus cannot perform preemption in the TxPoolSelectedNormal resource pool, that is, the priority of the PSSCH to be sent by the first terminal apparatus is less than the first priority threshold, and the first time-frequency resource for sending the PSSCH may be determined in the random-selection-based resource determination mechanism in the TxPoolSelectedNormal resource pool. It should be understood that the foregoing example is merely used to understand this solution. The first resource pool and the manner of determining, in the random-selection-based resource determination mechanism, a resource for sending the PSSCH may be flexibly determined based on an actual situation and a requirement.

In addition, when the preemption information is disabling the preemption-based resource determination mechanism and the first priority value is greater than or equal to the first priority threshold, or when the preemption information is enabling the preemption-based resource determination mechanism, it is determined to determine, in the random-selection-based resource determination mechanism in the second resource pool, the second time-frequency resource for sending the PSSCH. A manner of determining, in the random-selection-based resource determination mechanism in the second resource pool, the second time-frequency resource for sending the PSSCH may be similar to that described in step S204 in the foregoing embodiment, and details are not described herein again.

2. Determine to Send the PSSCH in a Partial-Sensing Selection Manner in the First Resource Pool.

Figure 5:
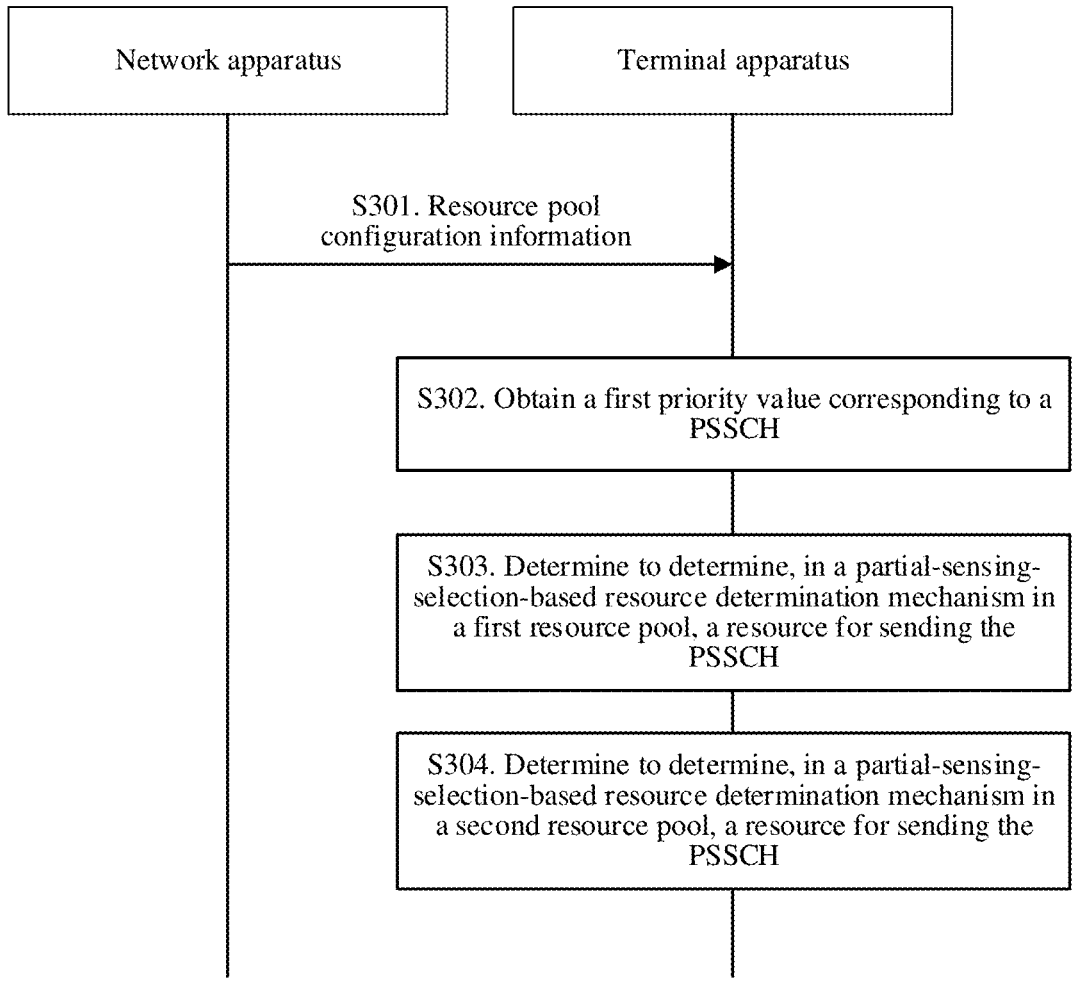
FIG. 5 is a schematic diagram of another embodiment of a data transmission method according to an embodiment.

In this embodiment, the first terminal apparatus may determine to send the PSSCH in the partial-sensing selection manner in the first resource pool. For ease of understanding, FIG. 5 is a schematic diagram of another embodiment of a data transmission method according to an embodiment. As shown in the figure, in this example, the data transmission method includes the following steps.

S301. A terminal apparatus obtains resource pool configuration information.

In this embodiment, the resource pool configuration information needs to be obtained first. The resource pool configuration information is obtained by the first terminal apparatus and may be resource pool configuration information sent by a network apparatus and received by the first terminal apparatus. The resource pool configuration information may be similar to that described in step S101 in the foregoing embodiment and details are not described herein again.

Further, the first resource pool information included in the resource pool configuration information further indicates partial-sensing selection configuration information, and the partial-sensing selection configuration information includes enabling the partial-sensing-selection-based resource determination mechanism or disabling the partial-sensing-selection-based resource determination mechanism.

S302. The terminal apparatus obtains a first priority value corresponding to a PSSCH.

In this embodiment, the first priority value is obtained, where the first priority value is a priority corresponding to the PSSCH, the first priority may be indicated in corresponding SCI, and the first priority value is obtained by the first terminal apparatus. In actual application, the first priority value may be a priority corresponding to data carried on the PSSCH, or the first priority value may be a priority corresponding to a data service carried on the PSSCH. The first priority value may be similar to that described in step S102 in the foregoing embodiment, and details are not described herein again.

S303. The terminal apparatus determines to determine, in a partial-sensing-selection-based resource determination mechanism in a first resource pool, a resource for sending the PSSCH.

In this embodiment, because the first resource pool information further indicates partial-sensing selection configuration information, when the partial-sensing selection configuration information indicated by the first resource pool information includes the enabling the partial-sensing-selection-based resource determination mechanism, that is, when the partial-sensing selection configuration information is configured, it indicates that the first terminal apparatus may determine, in the partial-sensing-selection-based resource determination mechanism in the first resource pool, a first time-frequency resource for sending the PSSCH. Alternatively, when the partial-sensing selection configuration information in the first resource pool information is configured to enable the partial-sensing-selection-based resource determination mechanism, the first terminal apparatus may determine, in the partial-sensing-selection-based resource determination mechanism in the first resource pool, the first time-frequency resource for sending the PSSCH. Further, when the partial-sensing selection configuration information is not configured, or the partial-sensing selection configuration information in the first resource pool information is configured to disable the partial-sensing-selection-based resource determination mechanism, the first terminal apparatus cannot determine, in the partial-sensing-selection-based resource determination mechanism in the first resource pool, the first time-frequency resource for sending the PSSCH. It should be understood that a manner of determining, in the partial-sensing-selection-based resource determination mechanism in the first resource pool, the first time-frequency resource for sending the PSSCH may be similar to that described in step S103 in the foregoing embodiment, and details are not described herein again.

For example, an example in which the first resource pool is TxPoolSelectedNormal is used for description. When the resource pool information corresponding to TxPoolSelectedNormal includes that the partial-sensing-selection-based resource determination mechanism is enabled, the first terminal apparatus selects the first time-frequency resource from the TxPoolSelectedNormal resource pool in the partial-sensing-selection-based resource determination mechanism to send the PSSCH. In addition, when the partial-sensing selection configuration information in the resource pool information corresponding to TxPoolSelectedNormal is configured to enable the partial-sensing-selection-based resource determination mechanism, the first terminal apparatus may also select the first time-frequency resource from the TxPoolSelectedNormal resource pool in the partial-sensing-selection-based resource determination mechanism to send the PSSCH. It should be understood that the foregoing example is merely used to understand this solution. A manner of determining, in the partial-sensing-selection-based resource determination mechanism, a resource for sending the PSSCH may be flexibly performed based on an actual situation and a requirement.

S304. The terminal apparatus determines to determine, in the partial-sensing-selection-based resource determination mechanism in a second resource pool, a resource for sending the PSSCH.

In this embodiment, because the first resource pool information further indicates partial-sensing selection configuration information, when the partial-sensing selection configuration information indicated by the first resource pool information includes that the partial-sensing-selection-based resource determination mechanism is disabled, that is, when the partial-sensing selection configuration information in the first resource pool information is not configured, or when the partial-sensing selection configuration information in the first resource pool information is configured to disable the partial-sensing-selection-based resource determination mechanism, the first terminal apparatus cannot determine, in the partial-sensing-selection-based resource determination mechanism in the first resource pool, the first time-frequency resource for sending the PSSCH. In this case, the first terminal apparatus may determine, in the partial-sensing-selection-based resource determination mechanism in the second resource pool, a second time-frequency resource for sending the PSSCH. It should be understood that a manner of determining, in the partial-sensing-selection-based resource determination mechanism in the second resource pool, the second time-frequency resource for sending the PSSCH may be similar to that described in step S104 in the foregoing embodiment, and details are not described herein again.

For example, in this embodiment, an example in which the first resource pool is TxPoolSelectedNormal and the second resource pool is TxPoolSelectedPSNormal is used for description. When the partial-sensing selection configuration information is not configured in the resource pool information corresponding to TxPoolSelectedNormal, or the partial-sensing selection configuration information is configured to disable the partial-sensing-selection-based resource determination mechanism, the first terminal apparatus cannot select the first time-frequency resource in the partial-sensing-selection-based resource determination mechanism from the TxPoolSelectedNormal resource pool to send the PSSCH. In this case, the first terminal apparatus may select the second time-frequency resource in the partial-sensing-selection-based resource determination mechanism from the TxPoolSelectedNormal resource pool to send the PSSCH. It should be understood that the foregoing example is merely used to understand this solution. A manner of determining, in the partial-sensing-selection-based resource determination mechanism, a resource for sending the PSSCH may be flexibly performed based on an actual situation and a requirement.

Optionally, the first resource pool information further indicates preemption information, and the preemption information includes enabling a preemption-based resource determination mechanism or disabling a preemption-based resource determination mechanism.

Because the partial-sensing-selection-based resource determination mechanism is to perform sensing in several time units, that is, the PSSCH sent by the first terminal apparatus is sent at one resource location determined based on a partial-sensing result without considering whether another terminal apparatus sends SCI in a time unit in which sensing is not performed to perform resource reservation, even if a candidate resource is actually reserved by another terminal apparatus, the first terminal apparatus selects the candidate resource according to only the partial-sensing result obtained in the several time units, that is, the first terminal apparatus selects to send the PSSCH on the candidate resource. Therefore, in this case, the partial-sensing-selection-based resource determination mechanism is equivalent to preempting a reserved resource. In this embodiment, the first resource pool information indicates that the preemption information is associated with the partial-sensing selection configuration information. Therefore, when the first resource pool information indicates the preemption information, two data transmission manners may be included. In one manner, when the preemption information is enabling a preemption-based resource determination mechanism, and the first priority value is less than the first priority threshold, it may be determined to determine, in the partial-sensing-selection-based resource determination mechanism in the first resource pool, the resource for sending the PSSCH. In the other manner, when the preemption information is disabling a preemption-based resource determination mechanism, and the first priority value is less than the first priority threshold, it is determined to determine, in the partial-sensing-selection-based resource determination mechanism in the first resource pool, the resource for sending the PSSCH. The following separately describes the two manners.

(1) When the preemption information is the enabling the preemption-based resource determination mechanism, and the first priority value is less than the first priority threshold, it is determined to determine, in the partial-sensing-selection-based resource determination mechanism in the first resource pool, the resource for sending the PSSCH.

The preemption information may be enabling the preemption-based resource determination mechanism, that is, a resource for sending the PSSCH may be determined in the partial-sensing-selection-based resource determination mechanism in the first resource pool. It is determined whether the first priority value is less than the first priority threshold. When the first priority value is less than the first priority threshold, it may be determined to determine, in the partial-sensing-selection-based resource determination mechanism in the first resource pool, the first time-frequency resource for sending the PSSCH. It should be understood that a manner of determining, in the partial-sensing-selection-based resource determination mechanism in the first resource pool, the first time-frequency resource for sending the PSSCH may be similar to that described in step S303 in the foregoing embodiment, and details are not described herein again.

For example, in this embodiment, an example in which the first resource pool is TxPoolSelectedNormal is used for description. Therefore, when the preemption information indicated by the TxPoolSelectedNormal resource pool information includes enabling the preemption-based resource determination mechanism, the preemption information indicated by the TxPoolSelectedNormal resource pool further provides a first priority threshold, that is, a first priority value of a PSSCH on which preemption is allowed needs to be less than the first priority threshold. In this case, if a priority of a PSSCH to be sent by the first terminal apparatus that intends to select a resource through partial-sensing selection is less than the first priority threshold, the first time-frequency resource for sending the PSSCH may be determined in the partial-sensing-selection-based resource determination mechanism from the TxPoolSelectedNormal resource pool. In other words, the partial-sensing-selection-based resource determination mechanism coexists with the full-sensing-based resource determination mechanism in the TxPoolSelectedNormal resource pool in a "preemption" manner. It should be understood that the foregoing example is merely used to understand this solution. The first resource pool and the manner of determining, in the partial-sensing-selection-based resource determination mechanism, a resource for sending the PSSCH may be flexibly determined based on an actual situation and a requirement.

In addition, when the preemption information is enabling the preemption-based resource determination mechanism and the first priority value is greater than or equal to the first priority threshold, or when the preemption information is disabling the preemption-based resource determination mechanism, the first terminal apparatus determines to determine, in the partial-sensing-selection-based resource determination mechanism in the second resource pool, the second time-frequency resource for sending the PSSCH. A manner of determining, in the partial-sensing-selection-based resource determination mechanism in the second resource pool, the second time-frequency resource for sending the PSSCH may be similar to that described in step S304 in the foregoing embodiment, and details are not described herein again.

(2) When the preemption information is the disabling the preemption-based resource determination mechanism, and the first priority value is less than the first priority threshold, it is determined to determine, in the partial-sensing-selection-based resource determination mechanism in the first resource pool, the resource for sending the PSSCH.

Because the partial-sensing-selection-based resource determination mechanism affects the full-sensing-selection-based resource determination mechanism in performance, and preemption may also affect the full-sensing-selection-based resource determination mechanism, allowing both the preemption-based resource determination mechanism and the partial-sensing-selection-based resource determination mechanism in the foregoing manner increases impact on the full-sensing-based resource determination mechanism, that is, performing in the first resource pool increases a collision probability of the PSSCH. Therefore, in this manner, only when the first resource pool information indicates the disabling the preemption-based resource determination mechanism, and the first priority value is less than the first priority threshold, the first terminal apparatus determines to determine, in the partial-sensing-selection-based resource determination mechanism in the first resource pool, a corresponding resource for sending a high-priority PSSCH. In any other case, the first terminal apparatus determines to determine, in the partial-sensing-selection-based resource determination mechanism in the second resource pool, a resource for sending the PSSCH. In this way, interference and conflict impact between partial-sensing selection and preemption can be reduced, so that a collision of sending a high-priority PS SCH in the partial-sensing-selection-based resource determination mechanism is reduced, and QoS of the high-priority PSSCH can be ensured.

Therefore, when the preemption information is the disabling the preemption-based resource determination mechanism, and the first priority value is less than the first priority threshold, the first terminal apparatus may determine, in the partial-sensing-selection-based resource determination mechanism in the first resource pool, the first time-frequency resource for sending the PSSCH. It should be understood that a manner of determining, in the partial-sensing-selection-based resource determination mechanism in the first resource pool, the first time-frequency resource for sending the PSSCH may be similar to that described in step S303 in the foregoing embodiment, and details are not described herein again.

For example, in this embodiment, an example in which the first resource pool is TxPoolSelectedNormal is used for description. Therefore, when the preemption information indicated by the TxPoolSelectedNormal resource pool information includes the disabling the preemption-based resource determination mechanism, the first terminal apparatus cannot perform preemption in the TxPoolSelectedNormal resource pool, that is, the priority of the PSSCH to be sent by the first terminal apparatus is less than the first priority threshold, and the first time-frequency resource for sending the PSSCH may be determined in the partial-sensing-selection-based resource determination mechanism in the TxPoolSelectedNormal resource pool. It should be understood that the foregoing example is merely used to understand this solution. The first resource pool and the manner of determining, in the partial-sensing-selection-based resource determination mechanism, a resource for sending the PSSCH may be flexibly determined based on an actual situation and a requirement.

In addition, when the preemption information is disabling the preemption-based resource determination mechanism and the first priority value is greater than or equal to the first priority threshold, or when the preemption information is enabling the preemption-based resource determination mechanism, it is determined to determine, in the partial-sensing-selection-based resource determination mechanism in the second resource pool, the second time-frequency resource for sending the PSSCH. A manner of determining, in the partial-sensing-selection-based resource determination mechanism in the second resource pool, the second time-frequency resource for sending the PSSCH may be similar to that described in step S304 in the foregoing embodiment, and details are not described herein again.

In the foregoing embodiment, a manner in which the first terminal apparatus determines to send the PSSCH in the first resource pool is described. Further, when any one of the following three conditions is met, the first terminal apparatus should determine, in the partial-sensing-selection-based resource determination mechanism and/or the random-selection-based resource determination mechanism in the first resource pool, a resource for sending the PSSCH.

A first condition is that a transmit power corresponding to the PSSCH is less than or equal to a transmit power threshold.

The transmit power threshold may be obtained based on configuration of the network apparatus, obtained based on preconfiguration, obtained based on an indication by another terminal apparatus by using SCI, or obtained based on configuration of a second terminal apparatus by using an SL MAC CE. In actual application, the transmit power threshold may alternatively be obtained by configuration of the second terminal apparatus through sidelink communication radio resource control, obtained based on factory setting, or obtained based on predefinition. The second terminal apparatus and the first terminal apparatus may be different terminal apparatuses and the sidelink communication radio resource control may be PC5-RRC. Therefore, a battery level threshold may need to be flexibly determined based on an actual situation.

In a possible implementation, the transmit power threshold may be further related to at least one of a congestion control parameter and a quality of service parameter. The congestion control parameter may be a CRB, and the quality of service parameter may include but may not be limited to a communication distance, geographical location information, PSSCH priority information, and the like. The communication distance may include a minimum communication distance. The geographical location information may include zone identity indication information. This is not limited herein.

A second condition is that a battery headroom of the first terminal apparatus is less than or equal to a battery level threshold.

The battery level threshold may be obtained based on configuration of the network apparatus, obtained based on preconfiguration, obtained based on an indication by another terminal apparatus by using SCI, or obtained based on configuration of the second terminal apparatus by using an SL MAC CE. In actual application, the battery level threshold may alternatively be obtained by configuration of the second terminal apparatus through sidelink communication radio resource control, obtained based on factory setting, or obtained based on predefinition. The second terminal apparatus and the first terminal apparatus may be different terminal apparatuses, and the sidelink communication radio resource control may be PC5-RRC. Therefore, a battery level threshold may need to be flexibly determined based on an actual situation.

A third condition is that the first terminal apparatus determines, based on an environment state, to enter a target state.

The target state may be that the terminal apparatus is in a non-charging mode, that is, whether the terminal apparatus is powered by an external power supply. If the terminal apparatus is in the non-charging mode, for example, if a handheld terminal apparatus leaves a vehicle and disconnects from a vehicle-mounted power supply, the PSSCH is sent in the first resource pool. If the terminal apparatus is in a charging mode, for example, if the handheld terminal apparatus enters the vehicle and connects to the vehicle-mounted power supply, the PSSCH is sent in the second resource pool. In addition, the target state may alternatively be that a speed corresponding to the terminal apparatus is greater than or equal to a speed threshold, that is, when the terminal apparatus is at a high speed in a period of time, the terminal apparatus considers that an external power supply can be provided. For example, if the handheld terminal apparatus enters the vehicle and runs on a highway, it may be determined that, in the first resource pool, the resource for sending the PSSCH is determined in the partial-sensing-selection-based resource determination mechanism and/or the random-selection-based resource determination mechanism. When the terminal apparatus is at a low speed in a period of time, for example, when the handheld terminal apparatus leaves the vehicle for walking or using a bicycle, it may be determined that, in the second resource pool, the resource for sending the PSSCH is determined in the partial-sensing-selection-based resource determination mechanism and/or the random-selection-based resource determination mechanism. The target state and application scenarios are not exhaustively listed herein. A target state may need to be flexibly determined based on an actual situation and an environment state.

Figure 6:
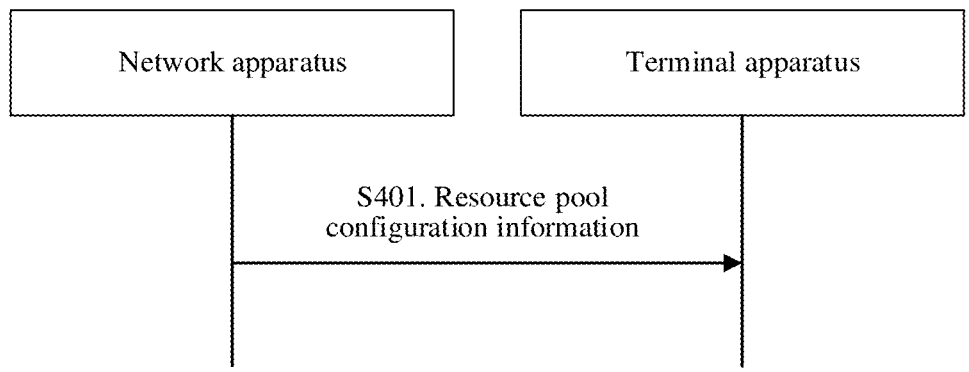
FIG. 6 is a schematic diagram of an embodiment of a data transmission method according to an embodiment.

The following describes in detail a data transmission method used in an embodiment by using a network apparatus as an execution body. FIG. 6 is a schematic diagram of an embodiment of a data transmission method according to an embodiment. The data transmission method includes the following steps.

S401. A network apparatus sends resource pool configuration information.

In this embodiment, the sending the resource pool configuration information may be sending, by the network apparatus, the resource pool configuration information to a first terminal apparatus. The resource pool configuration information includes first resource pool information and second resource pool information, the first resource pool information indicates a first resource pool, the second resource pool information indicates a second resource pool, the first resource pool and the second resource pool are different types of resource pools, the first resource pool is a set of first time-frequency resources, the second resource pool is a set of second time-frequency resources, and a resource determination mechanism of the first resource pool includes full sensing, a resource determination mechanism of the second resource pool includes partial-sensing selection and random selection. In addition, the resource pool configuration information may further indicate N sending resource pools and P receiving resource pools. Because the sending resource pools are used to send SLs, and the receiving resource pools are used to receive SLs, a total quantity of configured receiving resource pools is greater than or equal to a total quantity of configured sending resource pools, that is, P is greater than or equal to N. Therefore, the first terminal apparatus is enabled to receive, as much as possible, data sent from different sending resource pools. It should be understood that, in actual application, the resource determination mechanism of the first resource pool may further include partial-sensing selection and random selection. This is not limited herein.

After receiving the resource pool configuration information, the first terminal apparatus may further obtain a first priority value corresponding to the PSSCH, and then compare the first priority value with a first priority threshold. When the first priority value is less than the first priority threshold, the first terminal apparatus determines to send the PSSCH in the first resource pool; or when the first priority value is greater than or equal to the first priority threshold, determines to determine, in the partial-sensing-selection-based resource determination mechanism and/or the random-selection-based resource determination mechanism in the second resource pool, a resource for sending the PSSCH. The first priority threshold may be provided by the resource pool configuration information or provided by the first resource pool information.

Optionally, the first resource pool information further indicates random selection configuration information, and the random selection configuration information includes: enabling the random-selection-based resource determination mechanism or disabling the random-selection-based resource determination mechanism. After receiving the first resource pool information that indicates the random selection configuration information, the first terminal apparatus may determine, under different conditions, to determine, in different resource pools in the random-selection-based resource determination mechanism, a resource for sending the PSSCH. A manner of determining, in the random-selection-based resource determination mechanism in the first resource pool, the resource for sending the PSSCH and a manner of determining, in the random-selection-based resource determination mechanism in the second resource pool, the resource for sending the PSSCH are described in this embodiment described when the first terminal apparatus is an execution body, and details are not described herein again.

Optionally, the first resource pool information further indicates preemption information, and the preemption information includes enabling a preemption-based resource determination mechanism or disabling a preemption-based resource determination mechanism. After receiving the first resource pool information that indicates the preemption information, the first terminal apparatus may also determine, under different conditions, to determine, in the random-selection-based resource determination mechanism in different resource pools, the resource for sending the PSSCH. In this case, the preemption information may further provide the first priority threshold. A manner of determining, in the random-selection-based resource determination mechanism in the first resource pool, the resource for sending the PSSCH and a manner of determining, in the random-selection-based resource determination mechanism in the second resource pool, the resource for sending the PSSCH are described in this embodiment described when the first terminal apparatus is an execution body, and details are not described herein again.

Optionally, the first resource pool information further indicates partial-sensing selection configuration information, and the partial-sensing selection configuration information includes enabling the partial-sensing-selection-based resource determination mechanism or disabling the partial-sensing-selection-based resource determination mechanism. After receiving the first resource pool information that indicates partial-sensing selection configuration information, the first terminal apparatus may determine, under different conditions, to determine, in different resource pools in the partial-sensing-selection-based resource determination mechanism, a resource for sending the PSSCH. A manner of determining, in the partial-sensing-selection-based resource determination mechanism in the first resource pool, the resource for sending the PSSCH and a manner of determining, in the partial-sensing-selection-based resource determination mechanism in the second resource pool, the resource for sending the PSSCH are described in this embodiment described when the first terminal apparatus is an execution body, and details are not described herein again.

Optionally, the first resource pool information further indicates preemption information, and the preemption information includes enabling a preemption-based resource determination mechanism or disabling a preemption-based resource determination mechanism. After receiving the first resource pool information that indicates the preemption information, the first terminal apparatus may also determine, under different conditions, to determine, in the partial-sensing-selection-based resource determination mechanism in different resource pools, the resource for sending the PSSCH. A manner of determining, in the partial-sensing-selection-based resource determination mechanism in the first resource pool, the resource for sending the PSSCH and a manner of determining, in the partial-sensing-selection-based resource determination mechanism in the second resource pool, the resource for sending the PSSCH are described in this embodiment described when the first terminal apparatus is an execution body, and details are not described herein again.

The foregoing describes the embodiments from the perspective of the methods. It may be understood that, to implement the foregoing functions, a data transmission apparatus and a configuration apparatus for resource pool configuration information include corresponding hardware structures and/or software module for performing the functions. Persons skilled in the art should easily be aware that, in combination with the examples described in the embodiments, modules, algorithms and steps may be implemented by hardware or a combination of hardware and computer software. Whether a function is performed by hardware or hardware driven by computer software depends on a particular application. Persons skilled in the art may use different methods to implement the described functions for each particular application, but it should not be considered that the implementation goes beyond the scope of the embodiments.

In the embodiments, the data transmission apparatus and the configuration apparatus for resource pool configuration information may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in the embodiments, division into the modules is an example and is merely logical function division and may be other division in an actual implementation.

Figure 7:
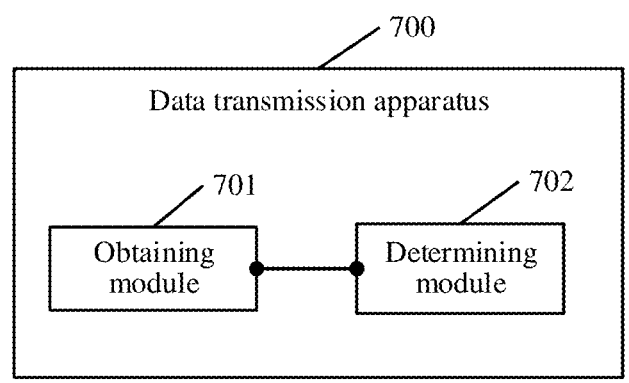
FIG. 7 is a schematic diagram of an embodiment of a data transmission apparatus according to an embodiment.

The following describes in detail a terminal apparatus. FIG. 7 is a schematic diagram of an embodiment of a data transmission apparatus. As shown in the figure, a data transmission apparatus 700 includes: an obtaining module 701, configured to obtain resource pool configuration information, where the resource pool configuration information includes first resource pool information and second resource pool information, the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes partial-sensing selection and random selection; and the obtaining module 701 is further configured to obtain a first priority value corresponding to a physical sidelink shared channel PSSCH; and a determining module 702, configured to: when the first priority value is less than a first priority threshold, determine, in the partial-sensing-selection-based resource determination mechanism and/or the random-selection-based resource determination mechanism in the first resource pool, a resource for sending the PSSCH; and the determining module 702 is further configured to: when the first priority value is greater than or equal to the first priority threshold, determine, in the partial-sensing-selection-based resource determination mechanism and/or the random-selection-based resource determination mechanism in the second resource pool, a resource for sending the PSSCH.

In some optional embodiments, the first resource pool information further indicates random selection configuration information, and the random selection configuration information includes: enabling the random-selection-based resource determination mechanism, or disabling the random-selection-based resource determination mechanism; and the determining module 702 is further configured to: when the first priority value is less than the first priority threshold, and the first resource pool information indicates the enabling the random-selection-based resource determination mechanism, determine, in the random-selection-based resource determination mechanism in the first resource pool, a resource for sending the PSSCH; or the determining module 702 is further configured to: when the first priority value is greater than or equal to the first priority threshold, and the first resource pool information indicates the enabling the random-selection-based resource determination mechanism, determine, in the random-selection-based resource determination mechanism in the second resource pool, a resource for sending the PSSCH; or the determining module 702 is further configured to: when the first resource pool information indicates the disabling the random-selection-based resource determination mechanism, determine, in the random-selection-based resource determination mechanism in the second resource pool, a resource for sending the PSSCH.

In some optional embodiments, the first resource pool information further indicates preemption information, and the preemption information includes enabling a preemption-based resource determination mechanism or disabling a preemption-based resource determination mechanism; and the determining module 702 is further configured to: when the first resource pool information indicates the enabling the preemption-based resource determination mechanism, and the first priority value is less than the first priority threshold, determine, in the random-selection-based resource determination mechanism in the first resource pool, a resource for sending the PSSCH; or the determining module 702 is further configured to: when the first resource pool information indicates the enabling the preemption-based resource determination mechanism, and the first priority value is greater than or equal to the first priority threshold, determine, in the random-selection-based resource determination mechanism in the second resource pool, a resource for sending the PSSCH; or the determining module 702 is further configured to: when the first resource pool information indicates the disabling the preemption-based resource determination mechanism, determine, in the random-selection-based resource determination mechanism in the second resource pool, a resource for sending the PSSCH.

In some optional embodiments, the first resource pool information further indicates preemption information, and the preemption information includes enabling a preemption-based resource determination mechanism or disabling a preemption-based resource determination mechanism; and the determining module 702 is further configured to: when the first resource pool information indicates the disabling the preemption-based resource determination mechanism, and the first priority value is less than the first priority threshold, determine, in the random-selection-based resource determination mechanism in the first resource pool, a resource for sending the PSSCH; or the determining module 702 is further configured to: when the first resource pool information indicates the disabling the preemption-based resource determination mechanism, and the first priority value is greater than or equal to the first priority threshold, determine, in the random-selection-based resource determination mechanism in the second resource pool, a resource for sending the PSSCH; or the determining module 702 is further configured to: when the first resource pool information indicates the enabling the preemption-based resource determination mechanism, determine, in the random-selection-based resource determination mechanism in the second resource pool, a resource for sending the PSSCH.

In some optional embodiments, the first resource pool information further indicates partial-sensing selection configuration information, and the partial-sensing selection configuration information includes enabling the partial-sensing-selection-based resource determination mechanism or disabling the partial-sensing-selection-based resource determination mechanism; and the determining module 702 is further configured to: when the first priority value is less than the first priority threshold, and the first resource pool information indicates the enabling the partial-sensing-selection-based resource determination mechanism, determine, in the partial-sensing-selection-based resource determination mechanism in the first resource pool, a resource for sending the PSSCH; or the determining module 702 is further configured to: when the first priority value is greater than or equal to the first priority threshold, and the resource pool configuration information indicates the enabling the partial-sensing-selection-based resource determination mechanism, determine, in the partial-sensing-selection-based resource determination mechanism in the second resource pool, a resource for sending the PSSCH; or the determining module 702 is further configured to: when the resource pool configuration information indicates the disabling the partial-sensing-selection-based resource determination mechanism, determine, in the partial-sensing-selection-based resource determination mechanism in the second resource pool, a resource for sending the PSSCH.

In some optional embodiments, the first resource pool information further indicates preemption information, and the preemption information includes enabling a preemption-based resource determination mechanism or disabling a preemption-based resource determination mechanism; and the determining module 702 is further configured to: when the first resource pool information indicates the enabling the preemption-based resource determination mechanism, and the first priority value is less than the first priority threshold, determine, in the partial-sensing-selection-based resource determination mechanism in the first resource pool, a resource for sending the PSSCH; or the determining module 702 is further configured to: when the first resource pool information indicates the enabling the preemption-based resource determination mechanism, and the first priority value is greater than or equal to the first priority threshold, determine, in the partial-sensing-selection-based resource determination mechanism in the second resource pool, a resource for sending the PSSCH; or the determining module 702 is further configured to: when the first resource pool information indicates the disabling the preemption-based resource determination mechanism, determine, in the partial-sensing-selection-based resource determination mechanism in the second resource pool, a resource for sending the PSSCH.

In some optional embodiments, the first resource pool information further indicates preemption information, and the preemption information includes enabling a preemption-based resource determination mechanism or disabling a preemption-based resource determination mechanism; and the determining module 702 is further configured to: when the first resource pool information indicates the disabling the preemption-based resource determination mechanism, and the first priority value is less than the first priority threshold, determine, in the partial-sensing-selection-based resource determination mechanism in the first resource pool, a resource for sending the PSSCH; or the determining module 702 is further configured to: when the first resource pool information indicates the disabling the preemption-based resource determination mechanism, and the first priority value is greater than or equal to the first priority threshold, determine, in the partial-sensing-selection-based resource determination mechanism in the second resource pool, a resource for sending the PSSCH; or the determining module 702 is further configured to: when the first resource pool information indicates the enabling the preemption-based resource determination mechanism, determine, in the partial-sensing-selection-based resource determination mechanism in the second resource pool, a resource for sending the PSSCH.

In some optional embodiments, the determining module 702 is further configured to: when a transmit power corresponding to the PSSCH is less than or equal to a transmit power threshold, perform the step of determining, in the partial-sensing-selection-based resource determination mechanism and/or the random-selection-based resource determination mechanism in the first resource pool, a resource for sending the PSSCH.

In some optional embodiments, the determining module 702 is further configured to: when a battery headroom is less than or equal to a battery level threshold, perform the step of determining, in the partial-sensing-selection-based resource determination mechanism and/or the random-selection-based resource determination mechanism in the first resource pool, a resource for sending the PSSCH.

In some optional embodiments, the determining module 702 is further configured to: determine, based on an environment state, to enter a target state, and perform the step of determining, in the partial-sensing-selection-based resource determination mechanism and/or the random-selection-based resource determination mechanism in the first resource pool, a resource for sending the PSSCH.

In some optional embodiments, the transmit power threshold is obtained based on configuration of a configuration apparatus for resource pool configuration information; the transmit power threshold is obtained based on preconfiguration; the transmit power threshold is obtained based on an indication of sidelink control information SCI; the transmit power threshold is obtained based on configuration of a sidelink Media Access Control control element (SL MAC CE); the transmit power threshold is obtained based on configuration of sidelink communication radio resource control; the transmit power threshold is obtained based on factory setting; or the transmit power threshold is obtained based on predefinition.

In some optional embodiments, the transmit power threshold is related to at least one of a congestion control parameter and a quality of service parameter.

In some optional embodiments, the battery level threshold is obtained based on configuration of a configuration apparatus for resource pool configuration information; the battery level threshold is obtained based on preconfiguration; the battery level threshold is obtained based on an indication of SCI; the battery level threshold is obtained based on configuration of an SL MAC CE; the battery level threshold is obtained based on configuration of sidelink communication radio resource control; the battery level threshold is obtained based on factory setting; or the battery level threshold is obtained based on predefinition.

In some optional embodiments, the target state is being in a non-charging mode; or the target state is that a corresponding speed is greater than or equal to a speed threshold.

In some optional embodiments, the first priority threshold is provided by the resource pool configuration information; the first priority threshold is provided by the first resource pool information; the first priority threshold is predefined; or the first priority threshold is preconfigured.

In some optional embodiments, the first priority threshold is provided by the preemption information.

In some optional embodiments, the resource pool configuration information further indicates N sending resource pools and P receiving resource pools, N is an integer greater than or equal to 1, P is an integer greater than or equal to 1, and P is greater than or equal to N.

In some optional embodiments, a value of bandwidth of a frequency domain resource for initial transmission of the PSSCH that is sent in a random selection manner in the first resource pool is one subchannel.

The data transmission apparatus in this embodiment may be a terminal apparatus, may be a chip applied to the terminal apparatus, another combined device, component, or the like that can implement functions of the foregoing terminal apparatus. When the data transmission apparatus is a terminal apparatus, the obtaining module may be a transceiver or a transceiver unit. The transceiver may include an antenna, a radio frequency circuit, and the like. The transceiver may be a transmitter and/or a receiver. The transceiver unit may be a sending unit and/or a receiving unit. The sending unit may be replaced with a transmitter. The receiving unit may be replaced with a receiver. The determining module may be a processor, for example, a baseband chip. When the data transmission apparatus is a component having functions of the foregoing terminal apparatus, the obtaining module may be a radio frequency unit, and the determining module may be a processor. When the data transmission apparatus is a chip system, the obtaining module may be an input port of the chip system, and the determining module may be a processor of the chip system, for example, a central processing unit (central processing unit, CPU).

Figure 8:
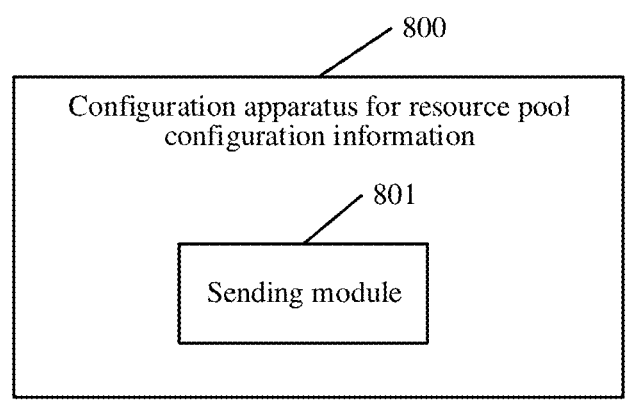
FIG. 8 is a schematic diagram of an embodiment of a configuration apparatus for resource pool configuration information according to an embodiment.

FIG. 8 is a schematic diagram of an embodiment of a configuration apparatus for resource pool configuration information. As shown in the figure, a network apparatus 800 includes: a sending module 801, configured to send resource pool configuration information, where the resource pool configuration information includes first resource pool information and second resource pool information, the first resource pool information indicates a first resource pool, the second resource pool information indicates a second resource pool, a resource determination mechanism of the first resource pool includes a full-sensing-selection-based resource determination mechanism, and a resource determination mechanism of the second resource pool includes a partial-sensing-selection-based resource determination mechanism and/or a random-selection-based resource determination mechanism;

The resource pool configuration information is used for: when a first priority value is less than a first priority threshold, determining, in the partial-sensing-selection-based resource determination mechanism and/or the random-selection-based resource determination mechanism in the first resource pool, a resource for sending a PSSCH; or when the first priority value is greater than or equal to the first priority threshold, determining, in the partial-sensing-selection-based resource determination mechanism and/or the random-selection-based resource determination mechanism in the second resource pool, a resource for sending the PSSCH.

The first priority value is a priority value corresponding to the physical sidelink shared channel PSSCH.

In some optional embodiments, the first resource pool information further indicates random selection configuration information, and the random selection configuration information includes: enabling the random-selection-based resource determination mechanism, or disabling the random-selection-based resource determination mechanism; and the resource pool configuration information is further used for: when the first priority value is less than the first priority threshold, and the first resource pool information indicates the enabling the random-selection-based resource determination mechanism, determining, in the random-selection-based resource determination mechanism in the first resource pool, a resource for sending the PSSCH; or when the first priority value is greater than or equal to the first priority threshold, and the first resource pool information indicates the enabling the random-selection-based resource determination mechanism, determining, in the random-selection-based resource determination mechanism in the second resource pool, a resource for sending the PSSCH; or when the first resource pool information indicates the disabling the random-selection-based resource determination mechanism, determining, in the random-selection-based resource determination mechanism in the second resource pool, a resource for sending the PSSCH.

In some optional embodiments, the first resource pool information further indicates preemption information, and the preemption information includes enabling a preemption-based resource determination mechanism or disabling a preemption-based resource determination mechanism; and the resource pool configuration information is further used for: when the first resource pool information indicates the enabling the preemption-based resource determination mechanism, and the first priority value is less than the first priority threshold, determining, in the random-selection-based resource determination mechanism in the first resource pool, a resource for sending the PSSCH; or when the first resource pool information indicates the enabling the preemption-based resource determination mechanism, and the first priority value is greater than or equal to the first priority threshold, determining, in the random-selection-based resource determination mechanism in the second resource pool, a resource for sending the PSSCH; or when the first resource pool information indicates the disabling the preemption-based resource determination mechanism, determining, in the random-selection-based resource determination mechanism in the second resource pool, a resource for sending the PSSCH.

In some optional embodiments, the first resource pool information further indicates preemption information, and the preemption information includes enabling a preemption-based resource determination mechanism or disabling a preemption-based resource determination mechanism; and the resource pool configuration information is further used for: when the first resource pool information indicates the disabling the preemption-based resource determination mechanism, and the first priority value is less than the first priority threshold, determining, in the random-selection-based resource determination mechanism in the first resource pool, a resource for sending the PSSCH; or when the first resource pool information indicates the disabling the preemption-based resource determination mechanism, and the first priority value is greater than or equal to the first priority threshold, determining, in the random-selection-based resource determination mechanism in the second resource pool, a resource for sending the PSSCH; or when the first resource pool information indicates the enabling the preemption-based resource determination mechanism, determining, in the random-selection-based resource determination mechanism in the second resource pool, a resource for sending the PSSCH.

In some optional embodiments, the first resource pool information further indicates partial-sensing selection configuration information, and the partial-sensing selection configuration information includes enabling the partial-sensing-selection-based resource determination mechanism or disabling the partial-sensing-selection-based resource determination mechanism; and the resource pool configuration information is further used for: when the first priority value is less than the first priority threshold, and the first resource pool information indicates the enabling the partial-sensing-selection-based resource determination mechanism, determining, in the partial-sensing-selection-based resource determination mechanism in the first resource pool, a resource for sending the PSSCH; or when the first priority value is greater than or equal to the first priority threshold, and the resource pool configuration information indicates the enabling the partial-sensing-selection-based resource determination mechanism, determining, in the partial-sensing-selection-based resource determination mechanism in the second resource pool, a resource for sending the PSSCH; or when the resource pool configuration information indicates the disabling the partial-sensing-selection-based resource determination mechanism, determining, in the partial-sensing-selection-based resource determination mechanism in the second resource pool, a resource for sending the PSSCH.

In some optional embodiments, the first resource pool information further indicates preemption information, and the preemption information includes enabling a preemption-based resource determination mechanism or disabling a preemption-based resource determination mechanism; and the resource pool configuration information is further used for: when the first resource pool information indicates the enabling the preemption-based resource determination mechanism, and the first priority value is less than the first priority threshold, determining, in the partial-sensing-selection-based resource determination mechanism in the first resource pool, a resource for sending the PSSCH; or when the first resource pool information indicates the enabling the preemption-based resource determination mechanism, and the first priority value is greater than or equal to the first priority threshold, determining, in the partial-sensing-selection-based resource determination mechanism in the second resource pool, a resource for sending the PSSCH; or when the first resource pool information indicates the disabling the preemption-based resource determination mechanism, determining, in the partial-sensing-selection-based resource determination mechanism in the second resource pool, a resource for sending the PSSCH.

In some optional embodiments, the first resource pool information further indicates preemption information, and the preemption information includes enabling a preemption-based resource determination mechanism or disabling a preemption-based resource determination mechanism; and the resource pool configuration information is further used for: when the first resource pool information indicates the disabling the preemption-based resource determination mechanism, and the first priority value is less than the first priority threshold, determining, in the partial-sensing-selection-based resource determination mechanism in the first resource pool, a resource for sending the PSSCH; or when the first resource pool information indicates the disabling the preemption-based resource determination mechanism, and the first priority value is greater than or equal to the first priority threshold, determining, in the partial-sensing-selection-based resource determination mechanism in the second resource pool, a resource for sending the PSSCH; or when the first resource pool information indicates the enabling the preemption-based resource determination mechanism, determining, in the partial-sensing-selection-based resource determination mechanism in the second resource pool, a resource for sending the PSSCH.

In some optional embodiments, the first priority threshold is provided by the resource pool configuration information; or the first priority threshold is provided by the first resource pool information.

In some optional embodiments, the first priority threshold is provided by the preemption information.

In some optional embodiments, the resource pool configuration information further indicates N sending resource pools and P receiving resource pools, N is an integer greater than or equal to 1, P is an integer greater than or equal to 1, and P is greater than or equal to N.

The configuration apparatus for resource pool configuration information in this embodiment may be a network apparatus, may be a chip applied to the network apparatus, another combined device, component, or the like that can implement functions of the foregoing network apparatus. When the configuration apparatus for resource pool configuration information is a network apparatus, the sending module may be a transceiver or a transceiver unit. The transceiver may include an antenna, a radio frequency circuit, and the like. The transceiver may be a transmitter and/or a receiver. The transceiver unit may be a sending unit and/or a receiving unit. The sending unit may be replaced with a transmitter. The receiving unit may be replaced with a receiver. When the configuration apparatus for resource pool configuration information is a component having functions of the foregoing network apparatus, the sending module may be a radio frequency unit.

It should be understood that the examples in FIG. 3 to FIG. 6 are provided merely for helping persons skilled in the art understand the embodiments, instead of limiting the embodiments to the scenarios shown in the examples. Persons skilled in the art may make various equivalent modifications or changes according to the examples shown in FIG. 3 to FIG. 6, and such modifications or changes also fall within the scope of the embodiments.

It should be further understood that the embodiments may be appropriately combined for use, and explanations or descriptions of terms in the embodiments may be mutually referenced or explained. This is not limited.

It should be understood that sequence numbers of the foregoing processes do not mean execution sequences in the various embodiments. The execution sequences of the processes should be determined according to functions and internal logic of the processes, and should not be construed as any limitation on the implementation processes of the embodiments.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on a computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk solid state disk (SSD)), or the like.

It may be clearly understood by persons skilled in the art that, for the purpose of convenient and brief description, for a detailed working process of the foregoing system, apparatus, and unit, refer to a corresponding process in the foregoing method embodiment. Details are not described herein again.

In the several embodiments, it should be understood that the system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments may be integrated into one processing unit, each of the units may exist alone physically, or two or more units may be integrated into one unit. The integrated unit may be implemented in a form of hardware or may be implemented in a form of a software function unit.

When the integrated unit is implemented in the form of a software functional unit and sold or used as an independent product, the integrated unit may be stored in a non-transitory computer-readable storage medium. Based on such an understanding, the embodiments, or the part contributing to the current technology, or all or some of the embodiments may be implemented in a form of a software product. The computer software product is stored in a non-transitory storage medium and includes several instructions for instructing a computer device (which may be a personal computer, a server, a network device, or the like) to perform all or some of the steps of the methods described in the embodiments. The foregoing non-transitory storage medium includes: any medium that can store program code, such as a USB flash drive, a removable hard disk, a read-only memory (ROM), a random access memory (RAM), a magnetic disk, or an optical disc.

The foregoing embodiments are merely intended for describing, but are not limiting. Although described in detail with reference to the foregoing embodiments, persons of ordinary skill in the art should understand that they may still make modifications to the foregoing embodiments or make equivalent replacements to some features thereof, without departing from the spirit and scope of the embodiments.

What is claimed is:

1. A data transmission method, comprising:
obtaining resource pool configuration information, wherein the resource pool configuration information comprises first resource pool information and second resource pool information, the first resource pool information indicates a first resource pool, the second resource pool information indicates a second resource pool, a resource determination mechanism of the first resource pool comprises a full-sensing-selection-based resource determination mechanism, a partial-sensing-selection-based resource determination mechanism, and/or a random-sensing-selection-based resource determination mechanism, and a resource determination mechanism of the second resource pool comprises a partial-sensing-selection-based resource determination mechanism and/or a random-selection-based resource determination mechanism;
obtaining a first priority value corresponding to a physical sidelink shared channel (PSSCH);
when the first priority value is less than a first priority threshold, determining, in the partial-sensing-selection-based resource determination mechanism and/or the random-selection-based resource determination mechanism in the first resource pool, a resource for sending the PSSCH; and
when the first priority value is greater than or equal to the first priority threshold, determining, in the partial-sensing-selection-based resource determination mechanism and/or the random-selection-based resource determination mechanism in the second resource pool, a resource for sending the PSSCH.

2. The data transmission method according to claim 1, wherein the first resource pool information further indicates random selection configuration information, and the random selection configuration information comprises:
  enabling the random-selection-based resource determination mechanism, or
  disabling the random-selection-based resource determination mechanism; and
  the method further comprises:
  when the first priority value is less than the first priority threshold, and the first resource pool information indicates the enabling the random-selection-based resource determination mechanism, determining, in the random-selection-based resource determination mechanism in the first resource pool, a resource for sending the PSSCH;
  when the first priority value is greater than or equal to the first priority threshold, and the first resource pool information indicates the enabling the random-selection-based resource determination mechanism, determining, in the random-selection-based resource determination mechanism in the second resource pool, a resource for sending the PSSCH; or
  when the first resource pool information indicates the disabling the random-selection-based resource determination mechanism, determining, in the random-selection-based resource determination mechanism in the second resource pool, a resource for sending the PSSCH.

3. The data transmission method according to claim 1, wherein the first resource pool information further indicates preemption information, and the preemption information comprises:
  enabling a preemption-based resource determination mechanism; or
  disabling a preemption-based resource determination mechanism; and
  the method further comprises:
  when the first resource pool information indicates the enabling the preemption-based resource determination mechanism, and the first priority value is less than the first priority threshold, determining, in the random-selection-based resource determination mechanism in the first resource pool, a resource for sending the PSSCH;
  when the first resource pool information indicates the enabling the preemption-based resource determination mechanism, and the first priority value is greater than or equal to the first priority threshold, determining, in the random-selection-based resource determination mechanism in the second resource pool, a resource for sending the PSSCH; or
  when the first resource pool information indicates the disabling the preemption-based resource determination mechanism, determining, in the random-selection-based resource determination mechanism in the second resource pool, a resource for sending the PSSCH.

4. The data transmission method according to claim 1, wherein the first resource pool information further indicates preemption information, and the preemption information comprises:
  enabling a preemption-based resource determination mechanism; or
  disabling a preemption-based resource determination mechanism; and
  the method further comprises:
  when the first resource pool information indicates the disabling the preemption-based resource determination mechanism, and the first priority value is less than the first priority threshold, determining, in the random-selection-based resource determination mechanism in the first resource pool, a resource for sending the PSSCH;
  when the first resource pool information indicates the disabling the preemption-based resource determination mechanism, and the first priority value is greater than or equal to the first priority threshold, determining, in the random-selection-based resource determination mechanism in the second resource pool, a resource for sending the PSSCH; or
  when the first resource pool information indicates the enabling the preemption-based resource determination mechanism, determining, in the random-selection-based resource determination mechanism in the second resource pool, a resource for sending the PSSCH.

5. A configuration method for resource pool configuration information, comprising:
  sending resource pool configuration information, wherein the resource pool configuration information comprises first resource pool information and second resource pool information, the first resource pool information indicates a first resource pool, the second resource pool information indicates a second resource pool, a resource determination mechanism of the first resource pool comprises a full-sensing-selection-based resource determination mechanism, a partial-sensing-selection-based resource determination mechanism, and/or a random-sensing-selection-based resource determination mechanism, and a resource determination mechanism of the second resource pool comprises a partial-sensing-selection-based resource determination mechanism and/or a random-selection-based resource determination mechanism;
  the resource pool configuration information is used for:
  when a first priority value is less than a first priority threshold, determining, in the partial-sensing-selection-based resource determination mechanism and/or the random-selection-based resource determination mechanism in the first resource pool, a resource for sending a PSSCH; or
  when the first priority value is greater than or equal to the first priority threshold, determining, in the partial-sensing-selection-based resource determination mechanism and/or the random-selection-based resource determination mechanism in the second resource pool, a resource for sending the PSSCH; and
  the first priority value is a priority value corresponding to the physical sidelink shared channel (PSSCH).

6. The configuration method according to claim 5, wherein the first resource pool information further indicates random selection configuration information, and the random selection configuration information comprises:
  enabling the random-selection-based resource determination mechanism, or
  disabling the random-selection-based resource determination mechanism; and
  the resource pool configuration information is further used for:
  when the first priority value is less than the first priority threshold, and the first resource pool information indicates the enabling the random-selection-based resource determination mechanism, determining, in the random-selection-based resource determination mechanism in the first resource pool, a resource for sending the PSSCH;

when the first priority value is greater than or equal to the first priority threshold, and the first resource pool information indicates the enabling the random-selection-based resource determination mechanism, determining, in the random-selection-based resource determination mechanism in the second resource pool, a resource for sending the PSSCH; or when the first resource pool information indicates the disabling the random-selection-based resource determination mechanism, determining, in the random-selection-based resource determination mechanism in the second resource pool, a resource for sending the PSSCH.

7. The configuration method according to claim 5, wherein the first resource pool information further indicates preemption information, and the preemption information comprises:

enabling a preemption-based resource determination mechanism; or disabling a preemption-based resource determination mechanism; and the resource pool configuration information is further used for:

when the first resource pool information indicates the enabling the preemption-based resource determination mechanism, and the first priority value is less than the first priority threshold, determining, in the random-selection-based resource determination mechanism in the first resource pool, a resource for sending the PSSCH;

when the first resource pool information indicates the enabling the preemption-based resource determination mechanism, and the first priority value is greater than or equal to the first priority threshold, determining, in the random-selection-based resource determination mechanism in the second resource pool, a resource for sending the PSSCH; or when the first resource pool information indicates the disabling the preemption-based resource determination mechanism, determining, in the random-selection-based resource determination mechanism in the second resource pool, a resource for sending the PSSCH.

8. The configuration method according to claim 5, wherein the first resource pool information further indicates preemption information, and the preemption information comprises:

enabling a preemption-based resource determination mechanism; or disabling a preemption-based resource determination mechanism; and the resource pool configuration information is further used for:

when the first resource pool information indicates the disabling the preemption-based resource determination mechanism, and the first priority value is less than the first priority threshold, determining, in the random-selection-based resource determination mechanism in the first resource pool, a resource for sending the PSSCH;

when the first resource pool information indicates the disabling the preemption-based resource determination mechanism, and the first priority value is greater than or equal to the first priority threshold, determining, in the random-selection-based resource determination mechanism in the second resource pool, a resource for sending the PSSCH; or when the first resource pool information indicates the enabling the preemption-based resource determination mechanism, determining, in the random-selection-based resource determination mechanism in the second resource pool, a resource for sending the PSSCH.

9. A data transmission apparatus, comprising:

a processor with a memory configured to store instructions that, when executed by the processor, cause the processor to execute:

an obtaining module, configured to obtain resource pool configuration information, wherein the resource pool configuration information comprises first resource pool information and second resource pool information, the first resource pool information indicates a first resource pool, the second resource pool information indicates a second resource pool, a resource determination mechanism of the first resource pool comprises a full-sensing-selection-based resource determination mechanism, a partial-sensing-selection-based resource determination mechanism, and/or a random sensing-selection-based resource determination mechanism, and a resource determination mechanism of the second resource pool comprises partial-sensing selection and random selection; and the obtaining module is further configured to obtain a first priority value corresponding to a physical sidelink shared channel (PSSCH); and a determining module, configured to:

when the first priority value is less than a first priority threshold, determine, in a partial-sensing-selection-based resource determination mechanism and/or a random-selection-based resource determination mechanism in the first resource pool, a resource for sending the PSSCH; and the determining module is further configured to:

when the first priority value is greater than or equal to the first priority threshold, determine, in the partial-sensing-selection-based resource determination mechanism and/or the random-selection-based resource determination mechanism in the second resource pool, a resource for sending the PSSCH.

10. The data transmission apparatus according to claim 9, wherein the first resource pool information further indicates random selection configuration information, and the random selection configuration information comprises:

enabling the random-selection-based resource determination mechanism, or disabling the random-selection-based resource determination mechanism; and the determining module is further configured to:

when the first priority value is less than the first priority threshold, and the first resource pool information indicates the enabling the random-selection-based resource determination mechanism, determine, in the random-selection-based resource determination mechanism in the first resource pool, a resource for sending the PSSCH;

the determining module is further configured to:

when the first priority value is greater than or equal to the first priority threshold, and the first resource pool information indicates the enabling the random-selection-based resource determination mechanism, determine, in the random-selection-based resource determination mechanism in the second resource pool, a resource for sending the PSSCH; or the determining module is further configured to:

when the first resource pool information indicates the disabling the random-selection-based resource determination mechanism, determine, in the random-selection-based resource determination mechanism in the second resource pool, a resource for sending the PSSCH.

11. The data transmission apparatus according to claim 9, wherein the first resource pool information further indicates preemption information, and the preemption information comprises;
enabling a preemption-based resource determination mechanism; or
disabling a preemption-based resource determination mechanism; and
the determining module is further configured to:
when the first resource pool information indicates the enabling the preemption-based resource determination mechanism, and the first priority value is less than the first priority threshold, determine, in the random-selection-based resource determination mechanism in the first resource pool, a resource for sending the PSSCH;
the determining module is further configured to:
when the first resource pool information indicates the enabling the preemption-based resource determination mechanism, and the first priority value is greater than or equal to the first priority threshold, determine, in the random-selection-based resource determination mechanism in the second resource pool, a resource for sending the PSSCH; or
the determining module is further configured to:
when the first resource pool information indicates the disabling the preemption-based resource determination mechanism, determine, in the random-selection-based resource determination mechanism in the second resource pool, a resource for sending the PSSCH.

12. The data transmission apparatus according to claim 9, wherein the first resource pool information further indicates preemption information, and the preemption information comprises:
enabling a preemption-based resource determination mechanism; or
disabling a preemption-based resource determination mechanism; and
the determining module is further configured to:
when the first resource pool information indicates the disabling the preemption-based resource determination mechanism, and the first priority value is less than the first priority threshold, determine, in the random-selection-based resource determination mechanism in the first resource pool, a resource for sending the PSSCH;
the determining module is further configured to:
when the first resource pool information indicates the disabling the preemption-based resource determination mechanism, and the first priority value is greater than or equal to the first priority threshold, determine, in the random-selection-based resource determination mechanism in the second resource pool, a resource for sending the PSSCH; or
the determining module is further configured to:
when the first resource pool information indicates the enabling the preemption-based resource determination mechanism, determine, in the random-selection-based resource determination mechanism in the second resource pool, a resource for sending the PSSCH.

13. A configuration apparatus for resource pool configuration information, comprising:

a processor with a memory configured to store instructions that, when executed by the processor, cause the processor to execute:
a sending module, configured to send resource pool configuration information, wherein the resource pool configuration information comprises first resource pool information and second resource pool information, the first resource pool information indicates a first resource pool, the second resource pool information indicates a second resource pool, a resource determination mechanism of the first resource pool comprises a full-sensing-selection-based resource determination mechanism, a partial-sensing-selection-based resource determination mechanism, and/or a random-sensing-selection-based resource determination mechanism, and a resource determination mechanism of the second resource pool comprises a partial-sensing-selection-based resource determination mechanism and/or a random-selection-based resource determination mechanism;
the resource pool configuration information is used for:
when a first priority value is less than a first priority threshold, determining, in the partial-sensing-selection-based resource determination mechanism and/or the random-selection-based resource determination mechanism in the first resource pool, a resource for sending a PSSCH; or
when the first priority value is greater than or equal to the first priority threshold, determining, in the partial-sensing-selection-based resource determination mechanism and/or the random-selection-based resource determination mechanism in the second resource pool, a resource for sending the PSSCH; and
the first priority value is a priority value corresponding to the physical sidelink shared channel (PSSCH).

14. The configuration apparatus for resource pool configuration information according to claim 13, wherein the first resource pool information further indicates random selection configuration information, and the random selection configuration information comprises:
enabling the random-selection-based resource determination mechanism, or
disabling the random-selection-based resource determination mechanism; and
the resource pool configuration information is further used for:
when the first priority value is less than the first priority threshold, and the first resource pool information indicates the enabling the random-selection-based resource determination mechanism, determining, in the random-selection-based resource determination mechanism in the first resource pool, a resource for sending the PSSCH;
when the first priority value is greater than or equal to the first priority threshold, and the first resource pool information indicates the enabling the random-selection-based resource determination mechanism, determining, in the random-selection-based resource determination mechanism in the second resource pool, a resource for sending the PSSCH; or
when the first resource pool information indicates the disabling the random-selection-based resource determination mechanism, determining, in the random-selection-based resource determination mechanism in the second resource pool, a resource for sending the PSSCH.

15. The configuration apparatus for resource pool configuration information according to claim 13, wherein the first resource pool information further indicates preemption information, and the preemption information comprises
  enabling a preemption-based resource determination mechanism or
  disabling a preemption-based resource determination mechanism; and
  the resource pool configuration information is further used for:
  when the first resource pool information indicates the enabling the preemption-based resource determination mechanism, and the first priority value is less than the first priority threshold, determining, in the random-selection-based resource determination mechanism in the first resource pool, a resource for sending the PSSCH;
  when the first resource pool information indicates the enabling the preemption-based resource determination mechanism, and the first priority value is greater than or equal to the first priority threshold, determining, in the random-selection-based resource determination mechanism in the second resource pool, a resource for sending the PSSCH; or
  when the first resource pool information indicates the disabling the preemption-based resource determination mechanism, determining, in the random-selection-based resource determination mechanism in the second resource pool, a resource for sending the PSSCH.

16. The configuration apparatus for resource pool configuration information according to claim 13, wherein the first resource pool information further indicates preemption information, and the preemption information comprises:
  enabling a preemption-based resource determination mechanism or
  disabling a preemption-based resource determination mechanism; and
  the resource pool configuration information is further used for:
  when the first resource pool information indicates the disabling the preemption-based resource determination mechanism, and the first priority value is less than the first priority threshold, determining, in the random-selection-based resource determination mechanism in the first resource pool, a resource for sending the PSSCH;
  when the first resource pool information indicates the disabling the preemption-based resource determination mechanism, and the first priority value is greater than or equal to the first priority threshold, determining, in the random-selection-based resource determination mechanism in the second resource pool, a resource for sending the PSSCH; or
  when the first resource pool information indicates the enabling the preemption-based resource determination mechanism, determining, in the random-selection-based resource determination mechanism in the second resource pool, a resource for sending the PSSCH.

* * * * *